US012755689B2

(12) United States Patent
Lee et al.

(10) Patent No.: US 12,755,689 B2
(45) Date of Patent: Oct. 6, 2026

(54) ELECTRONIC DEVICE AT LEAST PARTIALLY CHANGING VIEWING ANGLE OF IMAGE ON DISPLAY PANEL

(71) Applicant: Samsung Electronics Co., Ltd., Suwon-si (KR)

(72) Inventors: Jaesung Lee, Suwon-si (KR); Taewoong Lee, Suwon-si (KR); Kwangtai Kim, Suwon-si (KR); Suyeon Kim, Suwon-si (KR); Jinhyun Kim, Suwon-si (KR); Jongkon Bae, Suwon-si (KR); Byungduk Yang, Suwon-si (KR); Donghyun Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/629,794

(22) Filed: Mar. 26, 2026

(65) Prior Publication Data

US 2026/0268843 A1 Sep. 10, 2026

Related U.S. Application Data

(63) Continuation of application No. 19/443,632, filed on Jan. 8, 2026, which is a continuation of application No. PCT/KR2025/003645, filed on Mar. 21, 2025.

(30) Foreign Application Priority Data

May 14, 2024 (KR) ........................ 10-2024-0063403
Aug. 1, 2024 (KR) ........................ 10-2024-0102711

(51) Int. Cl.
*G09G 3/3225* (2016.01)

(52) U.S. Cl.
CPC ..... *G09G 3/3225* (2013.01); *G09G 2320/028* (2013.01); *G09G 2320/046* (2013.01);
(Continued)

(58) Field of Classification Search
None
See application file for complete search history.

(56) References Cited

U.S. PATENT DOCUMENTS 8,274,554 B2 * 9/2012 Nakamura ............. B60K 35/90 348/51
9,030,633 B2 * 5/2015 Kim .................. G02F 1/133512 349/111
(Continued)

FOREIGN PATENT DOCUMENTS

CN 116847680 A 10/2023
JP 2011-237612 A 11/2011
(Continued)

OTHER PUBLICATIONS

International Search Report dated Jul. 7, 2025, issued in International Application No. PCT/KR2025/003645.

*Primary Examiner* — Sepehr Azari
(74) *Attorney, Agent, or Firm* — Jefferson IP Law, LLP

(57) ABSTRACT

An electronic device is provided. The electronic device includes a display panel configured to adjust a viewing angle of at least a portion of an image displayed on the display panel, display driver circuitry, memory, including one or more storage media, storing instructions, and at least one processor, including processing circuitry, communicatively coupled to the display driver circuitry.

20 Claims, 20 Drawing Sheets

(52) U.S. Cl.
CPC ............... *G09G 2320/0653* (2013.01); *G09G 2320/068* (2013.01)

(56) References Cited

U.S. PATENT DOCUMENTS

| | | | | |
|---|---|---|---|---|
| 9,443,102 | B2 | 9/2016 | Cohen et al. | |
| 10,102,648 | B1 * | 10/2018 | Vannier | G06F 11/3003 |
| 10,496,831 | B2 | 12/2019 | Lancioni et al. | |
| 11,579,475 | B2 * | 2/2023 | Chen | G09G 3/3648 |
| 12,175,928 | B2 | 12/2024 | Wu et al. | |
| 2005/0286000 | A1 * | 12/2005 | Tsai | G02F 1/1393 349/96 |
| 2009/0303420 | A1 * | 12/2009 | Kim | G02F 1/133707 349/96 |
| 2013/0321452 | A1 | 12/2013 | Kawalkar et al. | |
| 2015/0356304 | A1 | 12/2015 | You | |
| 2016/0210476 | A1 | 7/2016 | Mun et al. | |
| 2019/0180664 | A1 * | 6/2019 | Sun | G06F 21/84 |
| 2021/0168349 | A1 * | 6/2021 | Wu | G09G 3/20 |
| 2021/0263365 | A1 * | 8/2021 | Hsieh | G02F 1/133504 |
| 2022/0050314 | A1 | 2/2022 | Hsieh et al. | |
| 2023/0126522 | A1 * | 4/2023 | Wu | H10K 59/8792 345/694 |
| 2023/0205923 | A1 | 6/2023 | Ibtehaz et al. | |
| 2023/0230521 | A1 * | 7/2023 | Wu | G09G 3/2003 345/428 |
| 2024/0112627 | A1 | 4/2024 | Kim et al. | |
| 2025/0013069 | A1 * | 1/2025 | Ota | G02B 30/31 |
| 2025/0040389 | A1 * | 1/2025 | Ma | H10K 59/122 |
| 2025/0275441 | A1 * | 8/2025 | Seo | H10K 59/879 |
| 2026/0063938 | A1 * | 3/2026 | Han | G02F 1/1323 |

FOREIGN PATENT DOCUMENTS

| | | | |
|---|---|---|---|
| KR | 10-1429582 | B1 | 8/2014 |
| KR | 10-2015-0062401 | A | 6/2015 |
| KR | 10-2015-0090840 | A | 8/2015 |
| KR | 10-2016-0089678 | A | 7/2016 |
| KR | 10-2018-0135342 | A | 12/2018 |
| KR | 10-1950379 | B1 | 2/2019 |
| KR | 10-2021-0121933 | A | 10/2021 |
| KR | 10-2022-0008699 | A | 1/2022 |
| KR | 10-2022-0029212 | A | 3/2022 |
| KR | 10-2022-0168009 | A | 12/2022 |
| WO | 2012/2918 | A1 | 6/2020 |

* cited by examiner

ELECTRONIC DEVICE AT LEAST PARTIALLY CHANGING VIEWING ANGLE OF IMAGE ON DISPLAY PANEL

CROSS-REFERENCE TO RELATED APPLICATION(S)

This application is a continuation application of prior application Ser. No. 19/443,632, filed on Jan. 8, 2026, which is a continuation application, claiming priority under 35 U.S.C. § 365 (c), of an International application No. PCT/KR2025/003645, filed on Mar. 21, 2025, which is based on and claims the benefit of a Korean patent application number 10-2024-0063403, filed on May 14, 2024, in the Korean Intellectual Property Office, and of a Korean patent application number 10-2024-0102711, filed on Aug. 1, 2024, in the Korean Intellectual Property Office, the disclosure of each of which is incorporated by reference herein in its entirety.

BACKGROUND

1. Field

The disclosure relates to an electronic device that at least partially changes a viewing angle of an image on a display panel.

2. Description of Related Art

An electronic device may display visual information through a display panel. For example, the visual information may be displayed through pixels in the display panel. For example, each of the pixels may include at least one first sub-pixel configured to emit light of a first color, at least one second sub-pixel configured to emit light of a second color, and at least one third sub-pixel configured to emit light of a third color.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that at least partially changes a viewing angle of an image on a display panel.

Additional aspects will be set forth in part in the description which follows and, in part, will be apparent from the description, or may be learned by practice of the presented embodiments.

In accordance with an aspect of the disclosure, an electronic device is provided. The electronic device includes a display panel configured to adjust a viewing angle of at least a portion of an image displayed on the display panel, display driver circuitry, memory, including one or more storage media, storing instructions, at least one processor, including processing circuitry, communicatively coupled to the display driver circuitry, wherein the instructions, when executed by the at least one processor individually or collectively, cause the display driver circuitry of the electronic device to display, on the display panel, an image including a first layer, and a second layer positioned on a first portion of the first layer to overlap the first layer, while displaying the image, receive, from the at least one processor, at least one command associated with a filter for user privacy, based on receiving, from the at least one processor, the at least one command according to a first input for applying the filter to the second layer of the image, narrow a viewing angle of the second layer of the image, in accordance with performing a pixel processing for the filter with respect to a first area of the display panel displaying the second layer of the image, based on receiving, from the at least one processor, the at least one command according to a second input for applying the filter to the first area of the display panel displaying the second layer of the image, narrow a viewing angle of a second portion of the first layer of the image and a viewing angle of the second layer of the image, in accordance with performing the pixel processing with respect to the first area of the display panel and a second area of the display panel around the first area of the display panel.

In accordance with another aspect of the disclosure, an electronic device is provided. The electronic device includes a display panel configured to adjust a viewing angle of at least a portion of an image displayed on the display panel, display driver circuitry, memory, including one or more storage media, storing instructions, at least one processor, including processing circuitry, communicatively coupled to the display driver circuitry, wherein the instructions, when executed by the at least one processor individually or collectively, cause the display driver circuitry of the electronic device to display, on the display panel, an image including a first layer, and a second layer positioned on a portion of the first layer to overlap the first layer, while displaying the image, receive, from the at least one processor, at least one command associated with a filter for user privacy, based on receiving, from the at least one processor, the at least one command according to a first input for applying the filter to the second layer of the image, narrow a viewing angle of the second layer of the image, in accordance with performing a first pixel processing of an area of the display panel that applies the filter in a targeted intensity to the area of the display panel displaying the second layer of the image, based on receiving, from the at least one processor, the at least one command according to a second input for applying the filter to the area of the display panel displaying the second layer of the image, narrow a viewing angle of the second layer of the image, in accordance with performing a second pixel processing of the area of the display panel that applies the filter to the area of the display panel by gradually increasing an intensity of the filter applied to the area of the display panel to the targeted intensity.

In accordance with another aspect of the disclosure, an electronic device is provided. The electronic device includes a display panel, configured to adjust a viewing angle of at least a portion of an image displayed on the display panel, memory, including one or more storage media, storing instructions, and at least one processor, including processing circuitry, communicatively coupled to the memory, wherein the instructions, when executed by the at least one processor individually or collectively, cause the electronic device to display, on the display panel, an image including a first layer, and a second layer positioned on a first portion of the first layer to overlap the first layer, while displaying the image, receive, from the at least one processor, an input associated with a filter for user privacy, based on the input identified as a first input for applying the filter to the second layer of the image, control the display panel to perform a pixel processing for the filter with respect to a first area of the display panel displaying the second layer of the image, in order to narrow a viewing angle of the second layer of the image, and based on the input identified as a second input for applying the filter to the first area of the display panel that displays the second layer of the image, control the display panel to perform the pixel processing with respect to the first area of the display panel and a second area of the display panel positioned around the first area of the display panel, in order to narrow a viewing angle of a second portion of the first layer of the image not overlapping the second layer of the image and a viewing angle of the second layer of the image.

In accordance with another aspect of the disclosure, an electronic device is provided. The electronic device includes a display panel, configured to adjust a viewing angle of at least a portion of an image displayed on the display panel, memory, including one or more storage media, storing instructions, and at least one processor, including processing circuitry, communicatively coupled to the memory, wherein the instructions, when executed by the at least one processor individually or collectively, cause the electronic device to display, on the display panel, an image including a first layer, and a second layer positioned on a portion of the first layer to overlap the first layer, while displaying the image, receive an input associated with a filter for user privacy, based on the input identified as a first input for applying the filter to the second layer of the image, perform a first pixel processing of an area of the display panel that applies the filter with a targeted intensity to the area of the display panel displaying the second layer of the image, in order to narrow a viewing angle of the second layer of the image, and based on the input identified as a second input for applying the filter to the area of the display panel displaying the second layer of the image, perform a second pixel processing of the area of the display panel that applies the filter to the area of the display panel by gradually increasing an intensity of the filter applied to the area of the display panel to the targeted intensity, in order to narrow a viewing angle of the second layer of the image.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
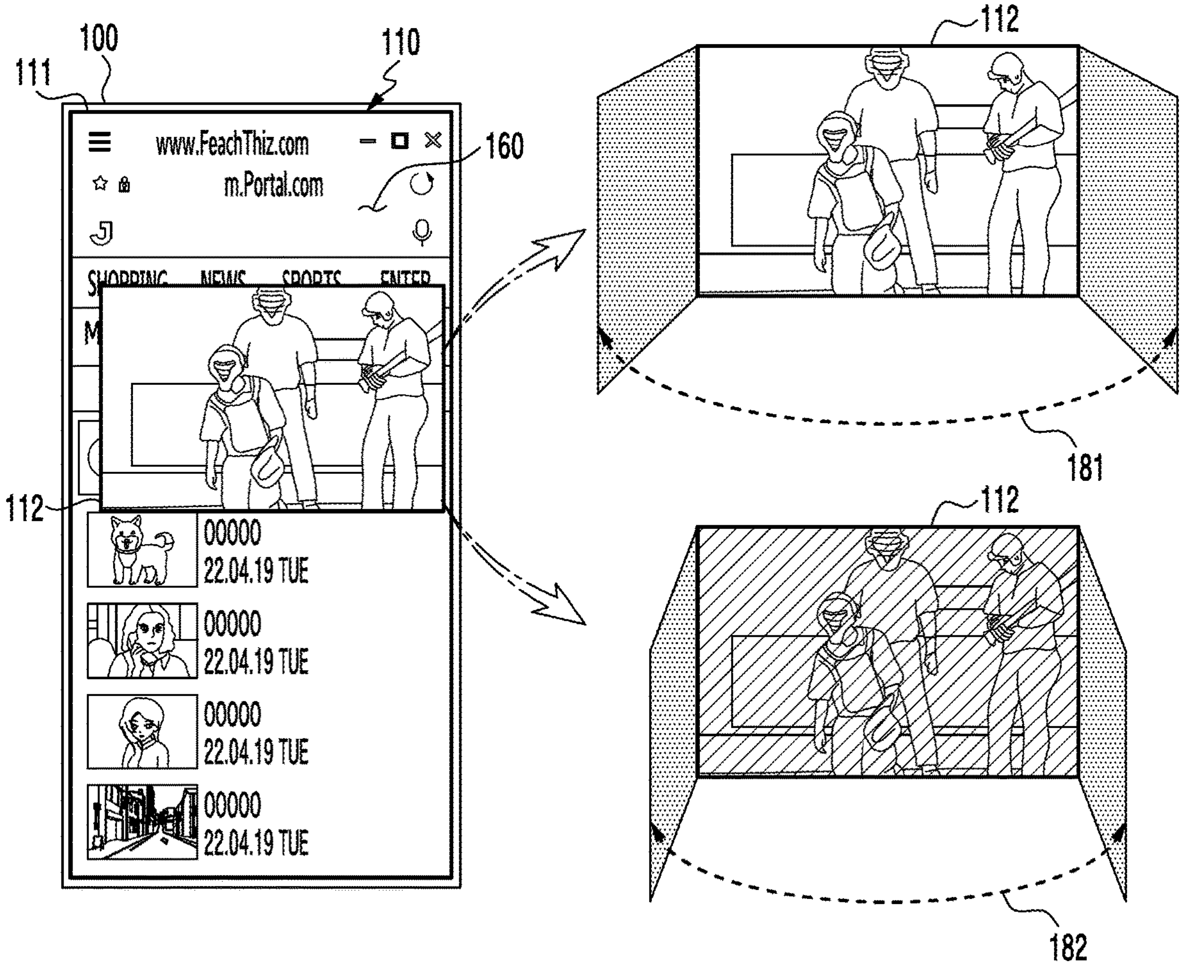
FIG. 1 illustrates adjusting a viewing angle of a portion of an active area of a display panel according to an embodiment of the disclosure.

FIG. 1 illustrates adjusting a viewing angle of a portion of an active area of a display panel according to an embodiment of the disclosure.

Referring to FIG. 1, an electronic device 100 may display an image 110 on a display panel 160. The image 110 may include a plurality of layers overlapping each other. For example, the image 110 may include a first layer 111 and a second layer 112. The second layer 112 may be positioned above (or over) the first layer 111 to at least partially overlap the first layer 111. For example, the second layer 112 positioned above the first layer 111 may overlap the first layer 111. For example, a portion of the first layer 111 positioned below the second layer 112 may (fully) overlap the second layer 112.

The electronic device 100 may provide a function (or feature) for user privacy with respect to a display on the display panel 160. For example, the filter for user privacy may be applied to at least a portion of the image 110 displayed on the display panel 160 of the electronic device 100 or an area of the display panel 160 that displays at least a portion of the image 110. The filter may be described as a function (or feature) of the electronic device 100 that reduces a viewing angle of the at least portion of the image 110 or a viewing angle of the area of the display panel 160 for user privacy. For example, the filter may be described as a privacy filter.

For example, the filter may be applied to one or more of layers of the image 110 displayed on the display panel 160. As a non-limiting example, the filter may be applied to the second layer 112, which is a layer of the first layer 111 and the second layer 112 of the image 110. For example, a viewing angle 182 of the second layer 112 to which the filter is applied may be narrower than a viewing angle 181 of the second layer 112 to which the filter is not applied. For example, a field of illumination (FOI) of light emitted from pixels in the display panel 160 used to display the second layer 112 of the image 110 to which the filter is applied may be narrower than an FOI of light emitted from pixels in the display panel 160 used to display the second layer 112 of the image 110 to which the filter is not applied. For example, an FOI of light emitted from pixels in the display panel 160 used to display the second layer 112 of the image 110 to which the filter is applied may be narrower than an FOI of light emitted from pixels in the display panel 160 used to display a portion (e.g., not overlapping with the second layer 112) of the first layer 111 of the image 110 to which the filter is not applied.

For example, the filter may be applied to a partial area of the display panel 160. As a non-limiting example, the filter may be applied to a partial area of the display panel 160 that displays the second layer 120 of the image 110. For example, a viewing angle 182 of the partial area (e.g., used to display the second layer 120) of the display panel 160 to which the filter is applied may be narrower than a viewing angle 181 of the partial area of the display panel 160 to which the filter is not applied. For example, an FOI of light emitted from pixels in the partial area (e.g., used to display the second layer 120) of the display panel 160 to which the filter is applied may be narrower than an FOI of light emitted from pixels in the partial area of the display panel 160 to which the filter is not applied. For example, an FOI of light emitted from pixels in the partial area (e.g., used to display the second layer 120) of the display panel 160 to which the filter is applied may be narrower than an FOI of light emitted from pixels in another partial area (e.g., used to display a portion of the first layer 111 not overlapping the second layer 120) of the display panel 160 to which the filter is not applied.

Figure 2:
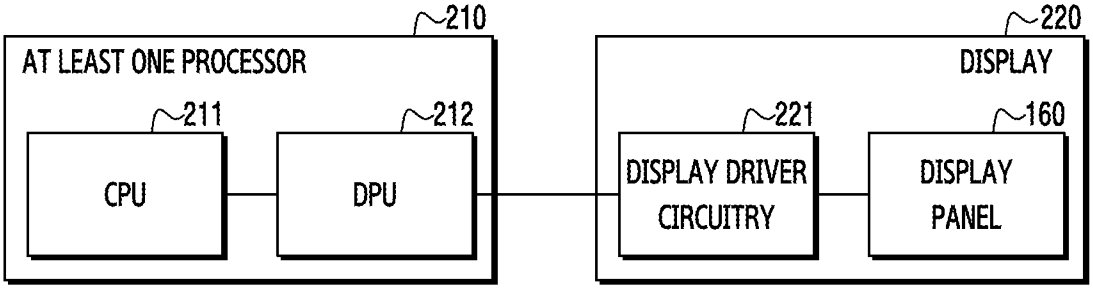
FIG. 2 is a schematic view of an electronic device according to an embodiment of the disclosure.

FIG. 2 is a schematic view of an electronic device according to an embodiment of the disclosure.

Referring to FIG. 2, the electronic device 100 may comprise at least one processor 210 comprising processing circuitry and a display 220. The electronic device 100 may include at least a portion of the electronic device 1901 of FIG. 19, or may correspond to at least a portion of the electronic device 1901 of FIG. 19.

Figure 19:
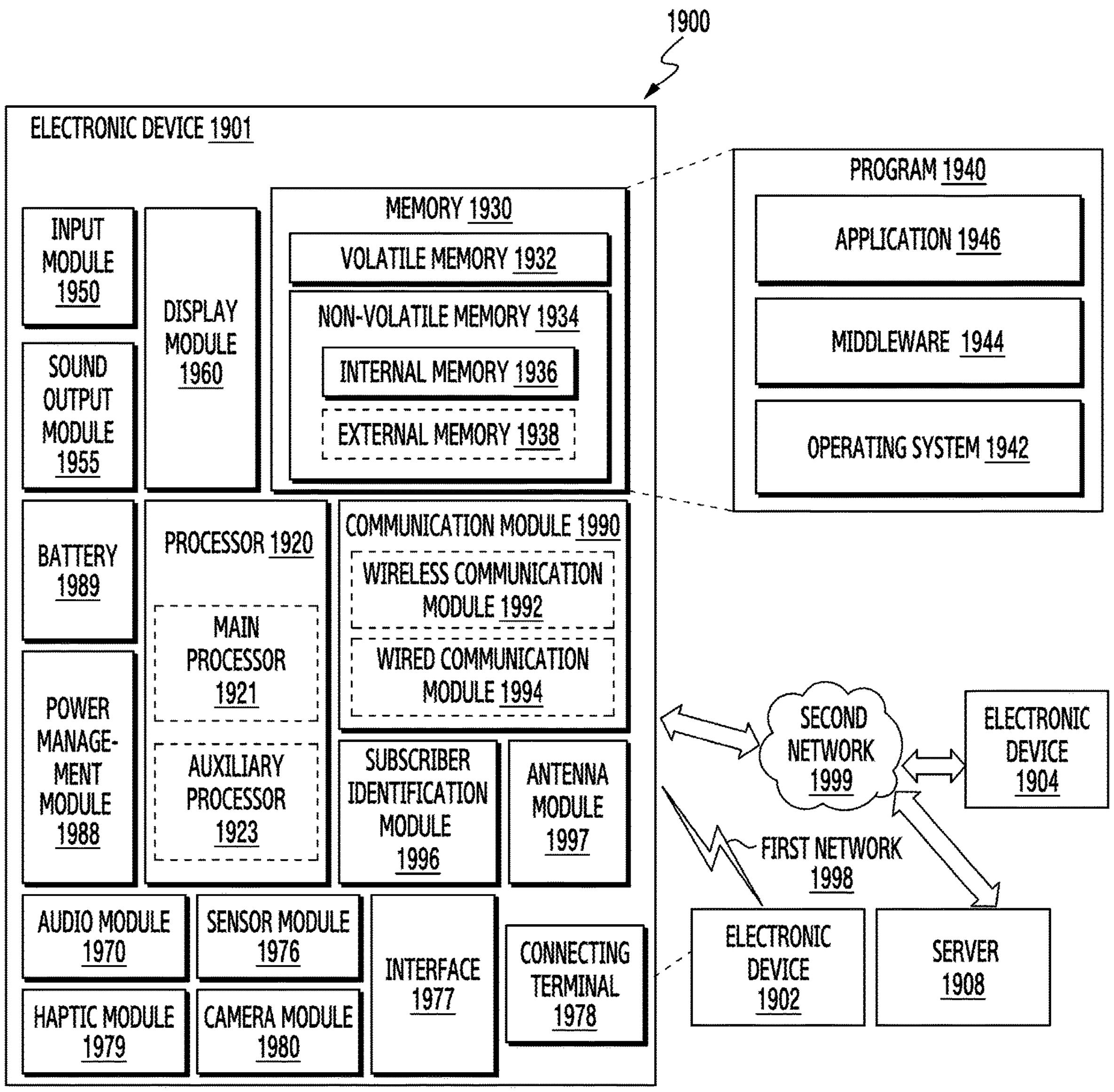
FIG. 19 is a block diagram of an electronic device in a network environment according to an embodiment of the disclosure.

The at least one processor 210 may include at least a portion of the processor 1920 of FIG. 19, or may correspond to at least a portion of the processor 1920 of FIG. 19. The at least one processor 210 may include a central processing unit 211 (e.g., including processing circuitry) and a display processing unit 212 (e.g., including processing circuitry). As a non-limiting example, the at least one processor 210 may further include a graphic processing unit (GPU) (e.g., including processing circuitry).

The display 220 may include at least a portion of the display module 1960 of FIG. 19 or may correspond to at least a portion of the display module 1960 of FIG. 19. The display 220 may include display driver circuitry (or display driver integrated circuitry) 221 and a display panel 160. The display driver circuitry 221 may include at least a portion of the display driver IC 2030 of FIG. 20 or may correspond to at least a portion of the display driver IC 2030 of FIG. 20. The display panel 160 may include at least a portion of the display 2010 of FIG. 20 or may correspond to at least a portion of the display 2010 of FIG. 20.

The display 220 may operate, or be driven for a command mode, a video mode, a hybrid video mode, and/or an adaptive refresh panel (ARP) of a mobile industry processor interface (MIPI) display serial interface (DSI).

The at least one processor 210 may be individually or collectively configured to perform at least a portion of the following operations by executing instructions stored in memory (e.g., including one or more storage media) of the electronic device 100. For example, when executed by the at least one processor individually or collectively, the instructions may cause the electronic device 100 to perform at least a portion of the following operations.

The display driver circuitry 221 may be individually or collectively configured to perform at least another portion of the following operations by executing instructions stored in the memory of the electronic device 100. For example, when executed by the display driver circuitry 221, the instructions may cause the electronic device 100 to perform at least another portion of the following operations.

The CPU 211 in the at least one processor 210 may generate or obtain an image to be displayed on the display panel 160. The DPU 212 in the at least one processor 210 may obtain the image from the CPU 211, and transmit the obtained image to the display driver circuitry 221.

For example, the DPU 212 may perform, before transmitting the image to the display driver circuitry 221, a pixel processing with respect to an area of the display panel 160 that displays at least a portion of the image, in order to apply the filter to the at least a portion of the image. According to the pixel processing, a viewing angle of the at least portion of the image displayed on the display panel 160 may be narrowed.

For example, the DPU 212 may perform, before transmitting the image to the display driver circuitry 221, a pixel processing with respect to an area of the display panel 160, in order to apply the filter to the area of the display panel 160 that displays the at least a portion of the image. According to the pixel processing, a viewing angle of the at least a portion of the image displayed on the area of the display panel 160 may be narrowed.

The pixel processing may be performed by the DPU 212 on a sub-pixel basis. For example, the pixel processing may be performed within the DPU 212 while the display 220 is operating for the video mode, the hybrid video mode (e.g., the hybrid video mode while disabling graphic random access memory (GRAM) in the display driver circuitry 221 (not illustrated) (e.g., the memory 2033 of FIG. 20)), or the ARP.

For example, the DPU 212 may transmit the image to the display driver circuitry 221 without the pixel processing exemplified above. The display driver circuitry 221 may receive the image from the DPU 212.

For example, in order to apply the filter to at least a portion of the image received from the DPU 212, the display driver circuitry 221 may perform a pixel processing with respect to an area of the display panel 160 that displays the at least a portion of the image. According to the pixel processing, a viewing angle of the at least a portion of the image displayed on the display panel 160 may be narrowed.

For example, in order to apply the filter to an area of the display panel 160 that displays the at least a portion of the image received from the DPU 212, the display driver circuitry 221 may perform a pixel processing with respect to the area of the display panel 160. According to the pixel processing, a viewing angle of the at least a portion of the image displayed on the area of the display panel 160 may be narrowed.

The pixel processing may be performed by the display driver circuitry 221 on a sub-pixel basis. For example, the pixel processing may be performed in the display driver circuitry 221 while the display 220 is operating for the command mode or the hybrid video mode (e.g., the hybrid video mode while enabling graphic random access memory (GRAM) in the display driver circuitry 221 (not illustrated) (e.g., the memory 2033 of FIG. 20)).

For example, the pixel processing may be described as performing control to narrow (or reduce) a viewing angle of one or more layers (e.g., the second layer 120) in an image (e.g., the image 110) to which the filter is applied. For example, the pixel processing may be described as performing control to narrow (or reduce) a viewing angle of an image (or a portion of the image) displayed on an area (or a partial area) of the display panel 160 to which the filter is applied. For example, for the above-exemplified pixel processing, the display panel 160 may have a structure for the filter. The structure is described with reference to FIGS. 3 to 6.

Figure 3:
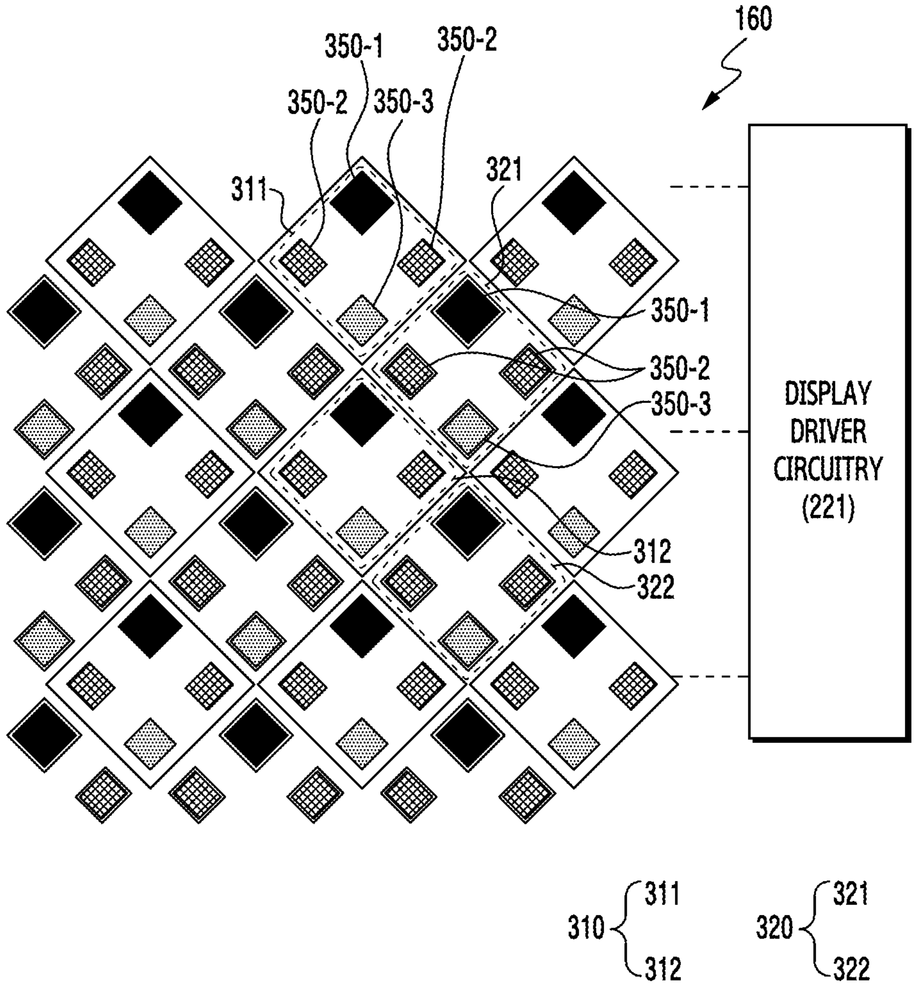
FIG. 3 illustrates a configuration of a display panel of an electronic device according to an embodiment of the disclosure.

FIG. 3 illustrates a configuration of a display panel of an electronic device according to an embodiment of the disclosure.

Referring to FIG. 3, the display panel 160 may include a plurality of pixels. Each of the plurality of pixels may include sub-pixels. The sub-pixels may include a first sub-pixel 350-1 configured to emit light of a first color (e.g., a red color), a second sub-pixel 350-2 configured to emit light of a second color (e.g., a green color), and a third sub-pixel 350-3 configured to emit light of a third color (e.g., a blue color). The sub-pixels may further include a fourth sub-pixel (not shown) configured to emit light of a fourth color (e.g., a white color).

An FOI of light emitted from one or more of the plurality of pixels may be narrower than an FOI of light emitted from other one or more of the plurality of pixels. For example, the one or more of the plurality of pixels may include a pixel 321 and a pixel 322. For example, the other one or more of the plurality of pixels may include a pixel 311 and a pixel 312.

For example, the one or more of the plurality of pixels may be positioned within (or inside) a first set 320 of areas in an active area (or display area) of the display panel 160, such as the pixel 321 and the pixel 322. For example, the other one or more of the plurality of pixels may be positioned within (or inside) a second set 310 of areas in the active area of the display panel 160, such as the pixel 311 and the pixel 312. As a non-limiting example, areas included in the first set 320 of areas and areas included in the second set 310 of areas may alternate with each other. As a non-limiting example, the areas included in the first set 320 of areas and the areas included in the second set 310 of areas may be included in the active area in an interleaved arrangement.

The display panel 160 may include an opaque member in another layer (e.g., another layer 402 of FIG. 4) of the display panel 160 disposed above a layer (e.g., a layer 401 of FIG. 4) of the display panel 160 including the plurality of pixels, in order to narrow (or reduce) an FOI of light emitted from the one or more of the plurality of pixels compared to an FOI of light emitted from the other one or more of the plurality of pixels. The opaque member in the other layer of the display panel 160 may be the structure for the filter. The opaque member in the other layer of the display panel 160 may be partially overlying the one or more of the plurality of pixels, and may not be overlying the other one or more of the plurality of pixels. The opaque member disposed in the other layer of the display panel 160 according to the example configuration of FIG. 3 is described with reference to FIG. 4.

Figure 4:
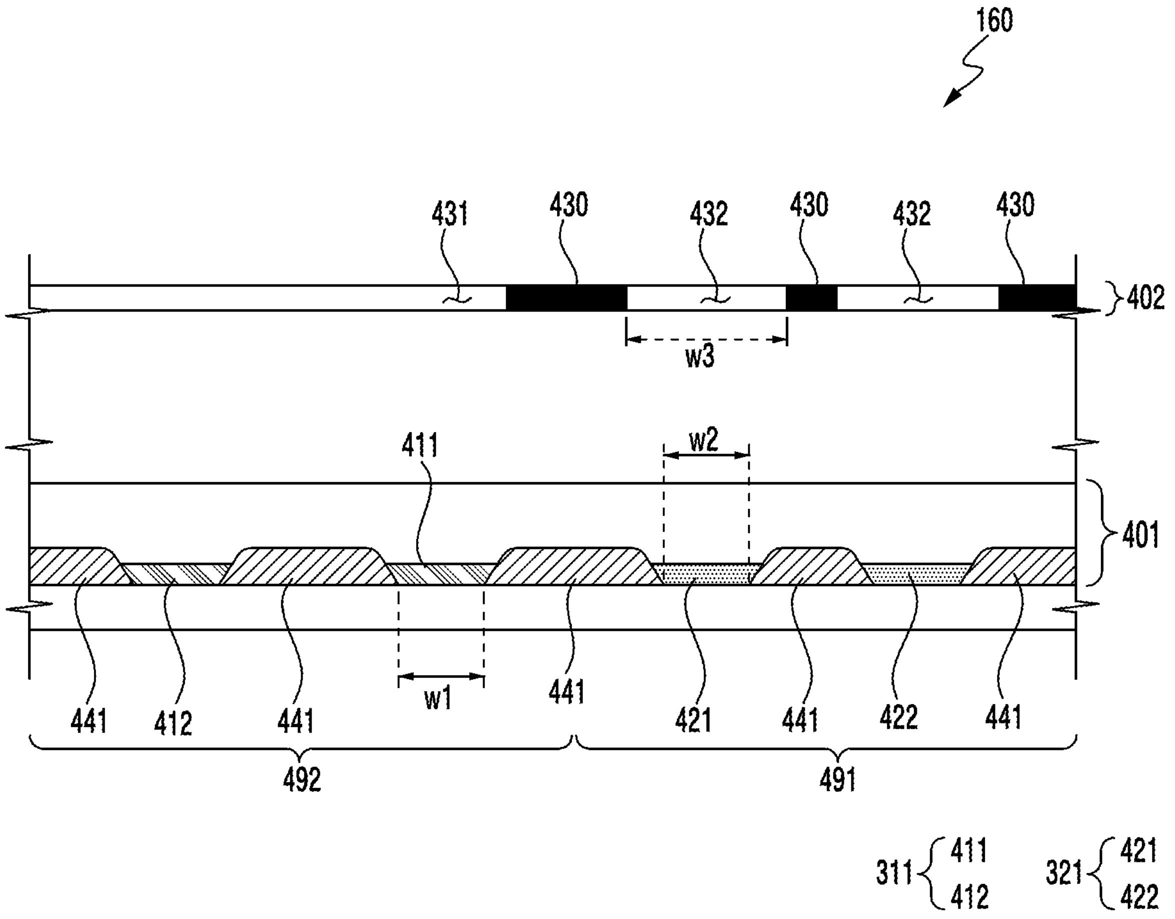
FIG. 4 is a cross-sectional view of a display panel according to a configuration of FIG. 3 according to an embodiment of the disclosure.

FIG. 4 is a cross-sectional view of a display panel according to a configuration of FIG. 3 according to an embodiment of the disclosure.

Referring to FIG. 4, the display panel 160 may include a layer 401 and another layer 402 disposed (or positioned) on the layer 401. The layer 401 of the display panel 160 may be described as an emission layer 401. The other layer 402 of the display panel 160 may be described as a masking layer 402 (or a mask layer 402).

The layer 401 of the display panel 160 may include a pixel 311 positioned in an area 492 included in a second set 310 of areas, and a pixel 321 positioned in an area 491 included in the first set 320 of areas. The pixel 311 may include a sub-pixel 411 and a sub-pixel 412. The pixel 321 may include a sub-pixel 421 and a sub-pixel 422.

The layer 401 of the display panel 160 may include a pixel definition layer (PDL) 441. The PDL 441 may define a periphery of the pixel 311 and a periphery of the pixel 321. The PDL 441 may define a periphery of the sub-pixel 411 in the pixel 311 and a periphery of the sub-pixel 412 in the pixel 311. The PDL 441 may define a periphery of the sub-pixel 421 in the pixel 321 and a periphery of the sub-pixel 422 in the pixel 321. For example, the PDL 441 may be disposed between the pixel 311 and the pixel 321, may be disposed between the sub-pixel 411 and the sub-pixel 412, and may be disposed between the sub-pixel 421 and the sub-pixel 422.

As a non-limiting example, a width w1 of the sub-pixel 411 defined by the PDL 441 may be equal to a width w2 of the sub-pixel 421 defined by the PDL 441. As a non-limiting example, the width w1 of the sub-pixel 411 defined by the PDL 441 may be wider than the width w2 of the sub-pixel 421 defined by the PDL 441.

The other layer 402 of the display panel 160 may include an opaque member 430 (or a black matrix 430). The opaque member 430 may be included in the other layer 402 of the display panel 160 for the filter. For example, the opaque member 430 may be partially overlying the pixel 321 and may not be overlying the pixel 311, in order to narrow an FOI of light emitted from the pixel 321 compared to an FOI of light emitted from the pixel 311. For example, the opaque member 430 may partially overlap the pixel 321 among the pixel 311 and the pixel 321. For example, the opaque member 430 may be disposed above (or over) a portion of the PDL 441, defining the pixel 321 and defining sub-pixels (e.g., the sub-pixel 421 and the sub-pixel 422) in the pixel 321, and may not be disposed above another portion of the PDL 441, defining the pixel 311 and defining sub-pixels (e.g., the sub-pixel 411 and the sub-pixel 412) in the pixel 311. For example, the opaque member 430 may include an opening 431 (or a first light transmittance portion 431 (or a first light transmittance area 431)) disposed over the pixel 311, and openings 432 (or second light transmittance portions 432 (or second light transmittance areas 432)) disposed over the pixel 321. For example, a size of the opening 431 may be larger than a size of each of the openings 432. For example, the sub-pixels in the pixel 311 may be positioned below the opening 431. For example, each of the sub-pixels in the pixel 321 may be respectively positioned below each of the openings 432.

As a non-limiting example, a width w3 of an opening of the openings 432 may be equal to a width w2 of the sub-pixel 421. As a non-limiting example, a width w3 of an opening of the openings 432 may be wider than a width w2 of the sub-pixel 421. As a non-limiting example, a width w3 of an opening of the openings 432 may be narrower than a width w2 of the sub-pixel 421.

As a non-limiting example, the display panel 160 may further include at least one layer disposed between the layer 401 and the other layer 402.

For example, the at least one layer may include a color filter layer. The color filter layer may include an opaque member including opaque portions positioned between the PDL 441 and the opaque member 430. For example, the opaque member included in the color filter layer of the display panel 160 may include an opening (or a light transmittance portion) corresponding to the opening 431 and openings (or light transmittance portions) respectively corresponding to the openings 432.

For example, the at least one layer may include a layer disposed on the color filter layer. The layer disposed on the color filter layer may include an opaque member including opaque portions positioned between the PDL 441 and the opaque member 430. For example, the opaque member included in the layer of the display panel 160 disposed on the color filter layer of the display panel 160 may include an opening (or a light transmittance portion) corresponding to the opening 431 and openings (or light transmittance portions) respectively corresponding to the openings 432.

Figure 5:
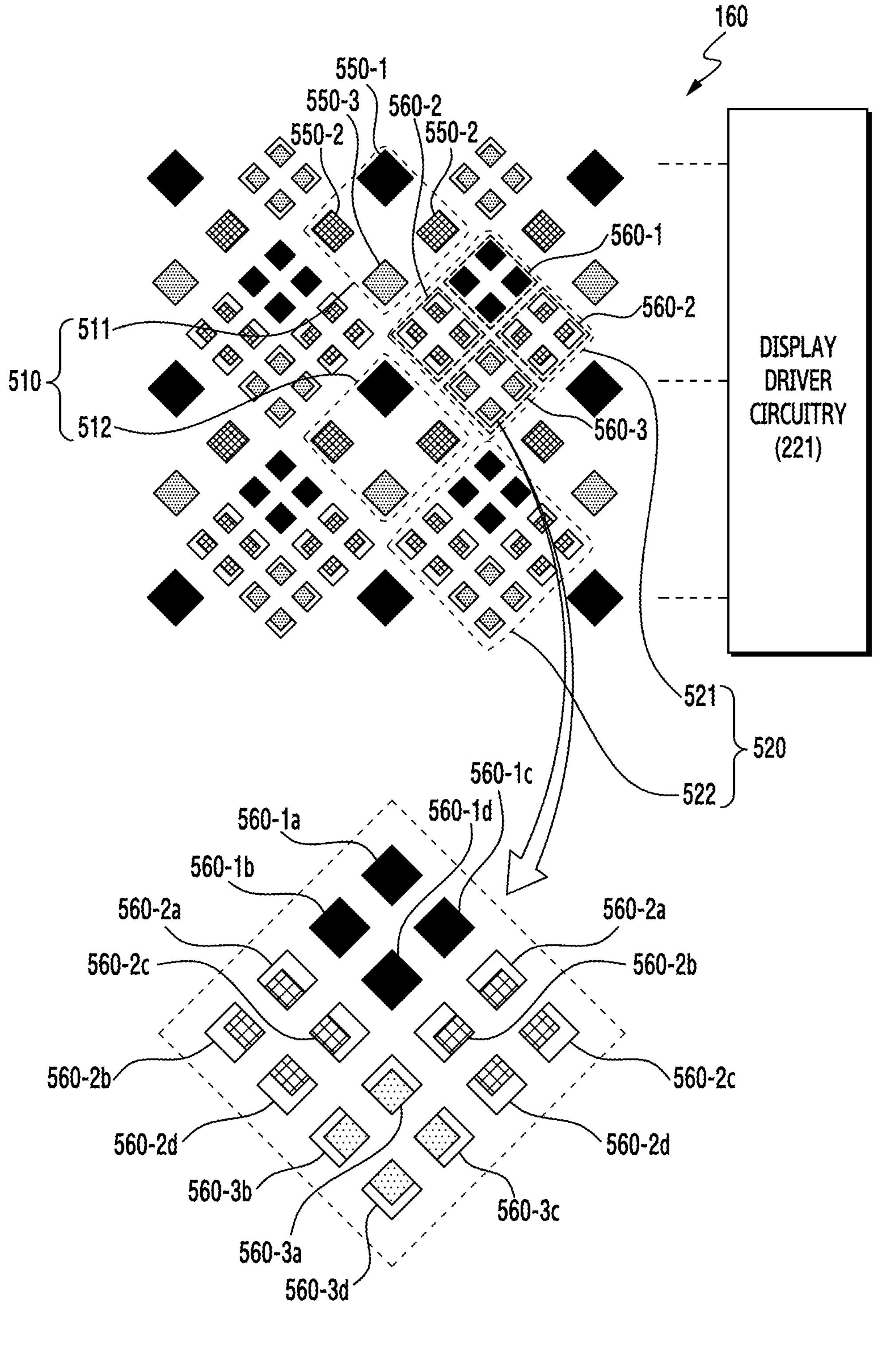
FIG. 5 illustrates a configuration of a display panel of an electronic device according to an embodiment of the disclosure.

FIG. 5 illustrates a configuration of a display panel of an electronic device according to an embodiment of the disclosure.

Referring to FIG. 5, the display panel 160 may include a plurality of pixels. Each of the plurality of pixels may include first pixels 510 and second pixels 520. For example, the first pixels 510 may include a pixel 511 and a pixel 512. For example, the second pixels 520 may include a pixel 521 and a pixel 522. As a non-limiting example, the first pixels 510 and the second pixels 520 may alternate with each other. As a non-limiting example, the first pixels 510 and the second pixels 520 may be disposed in an interleaved arrangement.

The first pixels 510 may include sub-pixels. The sub-pixels may include a first sub-pixel 550-1 configured to emit light in a first color (e.g., a red color), a second sub-pixel 550-2 configured to emit light in a second color (e.g., a green color), and a third sub-pixel 550-3 configured to emit light in a third color (e.g., a blue color). The sub-pixels may further include a fourth sub-pixel (not illustrated) configured to emit light in a fourth color (e.g., a white color).

The second pixels 520 may include sub-pixels. The sub-pixels may include a first sub-pixel 560-1 configured to emit light in a first color (e.g., a red color), a second sub-pixel 560-2 configured to emit light in a second color (e.g., a green color), and a third sub-pixel 560-3 configured to emit light in a third color (e.g., a blue color). The sub-pixels may further include a fourth sub-pixel (not illustrated) configured to emit light in a fourth color (e.g., a white color).

Each of the sub-pixels in each of the second pixels 520 may include portions spaced apart from each other. For example, the first sub-pixel 560-1 may include a first portion 560-1*a* of the first sub-pixel 560-1, a second portion 560-1*b* of the first sub-pixel 560-1, a third portion 560-1*c* of the first sub-pixel 560-1, and a fourth portion 560-1*d* of the first sub-pixel 560-1. The first portion 560-1*a* of the first sub-pixel 560-1, the second portion 560-1*b* of the first sub-pixel 560-1, the third portion 560-1*c* of the first sub-pixel 560-1, and the fourth portion 560-1*d* of the first sub-pixel 560-1 may be spaced apart from each other. The first portion 560-1*a* of the first sub-pixel 560-1, the second portion 560-1*b* of the first sub-pixel 560-1, the third portion 560-1*c* of the first sub-pixel 560-1, and the fourth portion 560-1*d* of the first sub-pixel 560-1 may be described as micro-pixels of the first sub-pixel 560-1. For example, the second sub-pixel 560-2 may include a first portion 560-2*a* of the second sub-pixel 560-2, a second portion 560-2*b* of the second sub-pixel 560-2, a third portion 560-2*c* of the second sub-pixel 560-2, and a fourth portion 560-2*d* of the second sub-pixel 560-2. The first portion 560-2*a* of the second sub-pixel 560-2, the second portion 560-2*b* of the second sub-pixel 560-2, the third portion 560-2*c* of the second sub-pixel 560-2, and the fourth portion 560-2*d* of the second sub-pixel 560-2 may be spaced apart from each other. For example, the first portion 560-2*a* of the second sub-pixel 560-2, the second portion 560-2*b* of the second sub-pixel 560-2, the third portion 560-2*c* of the second sub-pixel 560-2, and the fourth portion 560-2*d* of the second sub-pixel 560-2 may be described as micro-pixels of the second sub-pixel 560-2. For example, the third sub-pixel 560-3 may include a first portion 560-3*a* of the third sub-pixel 560-3, a second portion 560-3*b* of the third sub-pixel 560-3, a third portion 560-3*c* of the third sub-pixel 560-3, and a fourth portion 560-3*d* of the third sub-pixel 560-3. The first portion 560-3*a* of the third sub-pixel 560-3, the second portion 560-3*b* of the third sub-pixel 560-3, the third portion 560-3*c* of the third sub-pixel 560-3, and the fourth portion 560-3*d* of the third sub-pixel 560-3 may be spaced apart from each other. For example, the first portion 560-3*a* of the third sub-pixel 560-3, the second portion 560-3*b* of the third sub-pixel 560-3, the third portion 560-3*c* of the third sub-pixel 560-3, and the fourth portion 560-3*d* of the third sub-pixel 560-3 may be described as micro-pixels of the third sub-pixel 560-3.

For example, an FOI of light emitted from the second pixels 520 may be wider than an FOI of light emitted from the first pixels 510. For example, in order to narrow (or reduce) the FOI of light emitted from the second pixels 520 compared to the FOI of light emitted from the first pixels 510, a layer of the display panel 160 including the plurality of pixels may include a PDL further defining the micro-pixels of the first sub-pixel 560-1, the micro-pixels of the second sub-pixel 560-2, and the micro-pixels of the third sub-pixel 560-3. For example, in order to narrow (or reduce) the FOI of light emitted from the second pixels 520 compared to the FOI of light emitted from the first pixels 510, another layer (e.g., another layer 602 of FIG. 6) of the display panel 160 disposed on the layer (e.g., the layer 601 of FIG. 6) of the display panel 160 including the plurality of pixels may include an opaque member. The opaque member in the other layer of the display panel 160 may be partially overlying the one or more of the plurality of pixels and may not be overlying the other one or more of the plurality of pixels. The PDL in the layer of the display panel 160 and the opaque member in the other layer of the display panel 160 may be the structure for the filter. The opaque member disposed in the other layer of the display panel 160 according to the example configuration of FIG. 5 is described with reference to FIG. 6.

Figure 6:
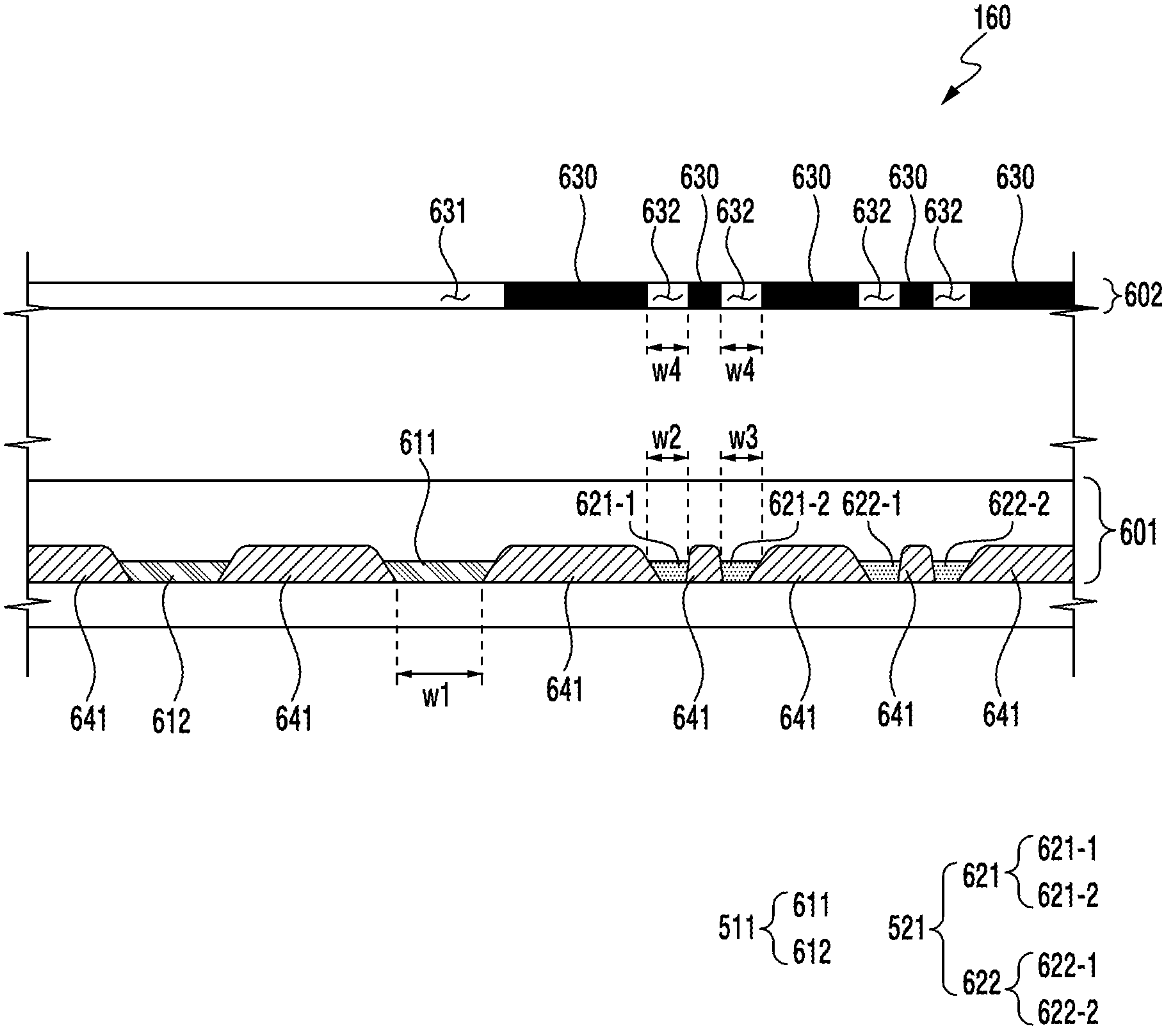
FIG. 6 is a cross-sectional view of a display panel according to a configuration of FIG. 5 according to an embodiment of the disclosure.

FIG. 6 is a cross-sectional view of a display panel according to a configuration of FIG. 5 according to an embodiment of the disclosure.

Referring to FIG. 6, the display panel 160 may include a layer 601 and another layer 602 disposed (or positioned) on the layer 601. The layer 601 of the display panel 160 may be described as a light emission layer 601. The other layer 602 of the display panel 160 may be described as a masking layer 602 (or a mask layer 602).

The layer 601 of the display panel 160 may include first pixels 510 and second pixels 520. The first pixels 510 may include a pixel 511. The pixel 511 may include a sub-pixel 611 and a sub-pixel 612. The second pixels 520 may include a pixel 521. The pixel 521 may include a sub-pixel 621 and a sub-pixel 622. The sub-pixel 621 may include a first portion 621-1 of the sub-pixel 621 and a second portion 621-2 of the sub-pixel 621. The sub-pixel 622 may include a first portion 622-1 of the sub-pixel 622 and a second portion 622-2 of the sub-pixel 622.

The layer 601 of the display panel 160 may include a pixel definition layer (PDL) 641. The PDL 641 may define a periphery of the pixel 511 and a periphery of the pixel 521. The PDL 641 may define a periphery of the sub-pixel 611 in the pixel 511 and a periphery of the sub-pixel 612 in the pixel 511. The PDL 641 may define a periphery of the sub-pixel 621 in the pixel 521 and a periphery of the sub-pixel 622 in the pixel 521. The PDL 641 may further define a periphery of the first portion 621-1 of the sub-pixel 621 and a periphery of the second portion 621-2 of the sub-pixel 621, relative to the PDL 441 (e.g., the PDL 441 of FIG. 4). The PDL 641 may further define a periphery of the first portion 622-1 of the sub-pixel 622 and a periphery of the second portion 622-2 of the sub-pixel 622, relative to the PDL 441 (e.g., the PDL 441 of FIG. 4). For example, the PDL 641 may be disposed between the pixel 511 and the pixel 521, may be disposed between the sub-pixel 611 and the sub-pixel 612, may be disposed between the sub-pixel 621 and the sub-pixel 622, may be disposed between the first portion 621-1 of the sub-pixel 621 and the second portion 621-2 of the sub-pixel 621, and may be disposed between the first portion 622-1 of the sub-pixel 622 and the second portion 622-2 of the sub-pixel 622.

As a non-limiting example, a width w1 of the sub-pixel 611 defined by the PDL 641 may be wider than a width w2 of the first portion 621-1 of the sub-pixel 621 defined by the PDL 641 and a width w3 of the second portion 621-2 of the sub-pixel 621 defined by the PDL 641. For example, a portion of the PDL 641 may be arranged with respect to the pixel 521 for the filter.

The other layer 602 of the display panel 160 may include an opaque member 630 (or a black matrix 630). The opaque member 630 may be included in the other layer 602 of the display panel 160 for the filter. For example, the opaque member 630 may be partially overlying the pixel 521 and may not be overlying the pixel 511, in order to narrow an FOI of light emitted from the pixel 521 compared to an FOI of light emitted from the pixel 511. For example, the opaque member 630 may partially overlap the pixel 521 among the pixel 511 and the pixel 521. For example, the opaque member 630 may be disposed above (or over) a portion of the PDL 641 defining the pixel 521 and defining sub-pixels (e.g., the sub-pixel 621 and the sub-pixel 622) in the pixel 521, and may not be disposed above (or over) another portion of the PDL 641 defining the pixel 511 and defining sub-pixels (e.g., the sub-pixel 611 and the sub-pixel 612) in the pixel 511. For example, the opaque member 630 may be further disposed above a portion of the PDL 641 defining the first portion 621-1 of the sub-pixel 621 and the second portion 621-2 of the sub-pixel 621, and a portion of the PDL 641 defining the first portion 622-1 of the sub-pixel 622 and the second portion 622-2 of the sub-pixel 622, relative to the opaque member 430 (e.g., the opaque member 430 of FIG. 4).

The opaque member 630 may include an opening 631 disposed above the pixel 511 and openings 632 disposed above the pixel 521. For example, a size of the opening 631 may be larger than a size of each of the openings 632.

As a non-limiting example, a width w4 of an opening of the openings 632 may be equal to a width w2 of the first portion 621-1 of the sub-pixel 621 (or a width w3 of the second portion 621-2 of the sub-pixel 621). As a non-limiting example, a width w4 of an opening of the openings 632 may be wider than a width w2 of the first portion 621-1 of the sub-pixel 621 (or a width w3 of the second portion 621-2 of the sub-pixel 621). As a non-limiting example, a width w4 of an opening of the openings 632 may be narrower than a width w2 of the first portion 621-1 of the sub-pixel 621 (or a width w3 of the second portion 621-2 of the sub-pixel 621).

Referring back to FIG. 2, since the pixel processing for applying the filter is performed on a sub-pixel basis, performing the pixel processing on a pipeline for displaying the image (e.g., the image 110) may be after performing one or more other pixel processings on the pipeline. For example, the one or more other pixel processings may indicate a processing on the pipeline affecting the filter. For example, the one or more other pixel processings may be described as a processing on the pipeline of adjusting a data voltage provided (or to be provided) to at least one other sub-pixel in the display panel 160 adjacent to the sub-pixel in the display panel 160 in association with adjusting a data voltage provided to a sub-pixel in the display panel 160. For example, the one or more other pixel processings may be described as a processing on the pipeline of adjusting a data voltage provided to the at least one other sub-pixel (e.g., adjacent to the sub-pixel in the display panel 160) in the display panel 160, in accordance with adjusting a data voltage provided to the sub-pixel in the display panel 160. The one or more other pixel processings may indicate a processing on the pipeline of adjusting a data voltage to be provided to one or more second sub-pixels peripheral to a first sub-pixel, in accordance with adjusting a data voltage to be provided to the first sub-pixel. The one or more other pixel processings may be different from a processing on the pipeline of maintaining a data voltage to be provided to the one or more second sub-pixels peripheral to the first sub-pixel, independently of adjusting the data voltage to be provided to the first sub-pixel. For example, the one or more other pixel processings may include performing an upscaling with respect to an image displayed on the display panel 160, performing an edge sharpening of at least one visual object included in the image, performing a blur processing with respect to at least a portion of the image, performing a high dynamic range (HDR) processing with respect to at least a portion of the image, performing a temporal dithering with respect to at least a portion of the image, performing a spatial dithering with respect to at least a portion of the image, performing a compensation of gradation with respect to the image, and/or performing a compensation of color temperature with respect to the image. For example, the DPU 212 may perform the pixel processing for user privacy, after performing the one or more other pixel processings with respect to the image. For example, the display driver circuitry 221 may perform the pixel processing for user privacy, after performing the one or more other pixel processings with respect to the image.

As a non-limiting example, the pixel processing for applying the filter may be performed before adjusting, by using the display driver circuitry, a data voltage provided to one or more sub-pixels respectively including one or more of a plurality of organic light emitting diodes (OLEDs) included in a plurality of pixels for a burn-in compensation of the one or more OLEDs.

For example, the pixel processing performed by the DPU 212 or the display driver circuitry 221 to apply a filter for user privacy to a portion of an active area of the display panel 160 may include a spatial transition. For example, the pixel processing performed by the DPU 212 or the display driver circuitry 221 to apply a filter for user privacy to a portion of an active area of the display panel 160 may include a temporal transition. The spatial transition is described with reference to FIG. 7, and the temporal transition is described with reference to FIG. 8.

Figure 7:
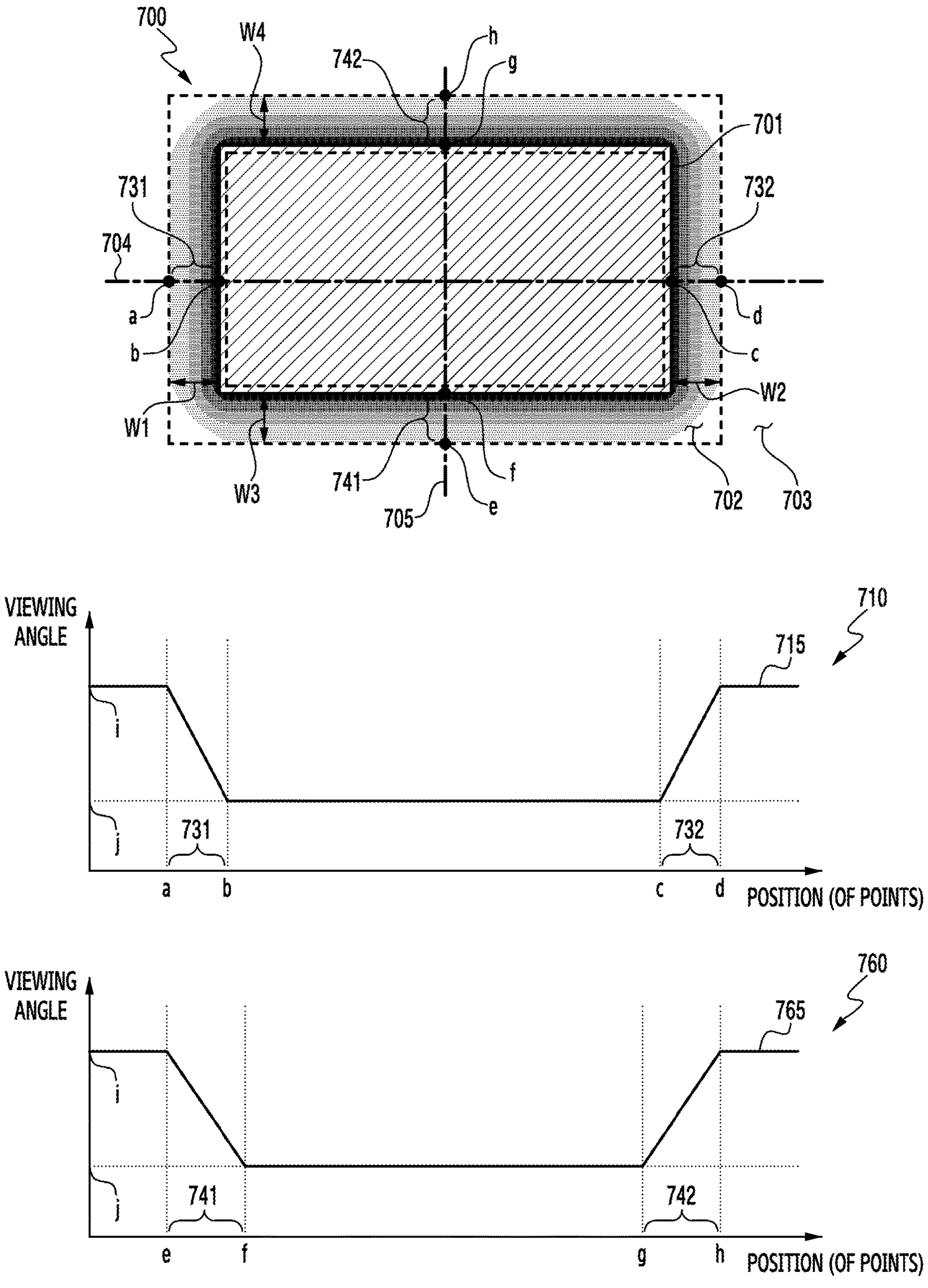
FIG. 7 illustrates a spatial transition in a pixel processing performed to apply a filter for user privacy to a portion of an active area of a display panel according to an embodiment of the disclosure.

FIG. 7 illustrates a spatial transition in a pixel processing performed to apply a filter for user privacy to a portion of an active area of a display panel according to an embodiment of the disclosure.

Referring to FIG. 7, a spatial transition may indicate further performing a pixel processing with respect to a second area 702 of the display panel 160 positioned around a first area 701 of the display panel 160, based on an input (or a setting) for applying the filter to the first area 701 of the display panel 160. For example, based on the input, the DPU 212 (or the display driver circuitry 221) may perform a first pixel processing with respect to the first area 701 of the display panel 160 and may perform a second pixel processing with respect to the second area 702 of the display panel 160. For example, the second pixel processing may include the spatial transition. For example, the second pixel processing may be performed to compensate for a visual quality reduced by a difference between a viewing angle of the first area 701 of the display panel 160, which is an area of the display panel 160 indicated by the input, and a viewing angle of a third area 703 of the display panel 160. For example, as in a state 700, an intensity of the filter applied to the first area 701 of the display panel 160 according to the first pixel processing may be constant (or unvarying), and an intensity of the filter applied to the second area 702 of the display panel 160 according to the second pixel processing may vary through (or according to) a position. For example, as in a state 700, the first area 701 of the display panel 160 according to the first pixel processing may have a viewing angle (or a single viewing angle), and the second area 702 of the display panel 160 according to the second pixel processing may have a plurality of viewing angles (or multiple viewing angles). The viewing angle of the first area 701 of the display panel 160 according to the first pixel processing and the viewing angle of the second area 702 of the display panel 160 according to the second pixel processing may be represented as a chart 710 and a chart 760.

A horizontal axis of the chart 710 indicates a position of points in a line 704, and a vertical axis of the chart 710 indicates a viewing angle. A viewing angle of the points in the line 704 may be represented as a line 715 in the chart 710. A point a and a point d in the line 704 may be positioned on a boundary between the second area 702 of the display panel 160 and the third area 703 of the display panel 160. For example, as indicated by the line 715 in the chart 710, a viewing angle of each of the point a and the point d in the line 704 may be an i, which is a viewing angle of the third area 703 of the display panel 160. A point b and a point c in the line 704 may be positioned on a boundary between the first area 701 of the display panel 160 and the second area 702 of the display panel 160. For example, as indicated by the line 715 in the chart 710, a viewing angle of each of the point b in the line 704 and the point c in the line 704 may be a j (herein, j is a real number lower than i), which is a viewing angle of the first area 701 of the display panel 160 targeted (or set) according to the input. For example, a viewing angle of a first portion 731 of the line 704 positioned between the point a and the point b corresponding to the second area 702 of the display panel 160 performing the second pixel processing may vary through a position between i and j. For example, a viewing angle of a second portion 732 of the line 404 positioned between the point c and the point d corresponding to the second area 702 of the display panel 160 performing the second pixel processing may vary through a position between i and j. For example, the DPU 212 (or the display driver circuitry 221) may perform the second pixel processing with respect to the second area 702 of the display panel 160, based on tapering an intensity of the filter applied to the second area 702 of the display panel 160 from a higher intensity near the first area 701 of the display panel 160 to a lower intensity peripheral to the second area 702 of the display panel 160.

A horizontal axis of the chart 760 indicates a position of points in a line 705, and a vertical axis of the chart 760 indicates a viewing angle. A viewing angle of the points in the line 705 may be represented as a line 765 in the chart 760. A point e and a point h in the line 705 may be positioned on a boundary between the second area 702 of the display panel 160 and a third area 703 of the display panel 160. For example, as indicated by the line 765 in the chart 760, a viewing angle of each of the point e in the line 705 and the point h in the line 705 may be an I, which is a viewing angle of the third area 703 of the display panel 160. A point f and a point g in the line 705 may be positioned on a boundary between the first area 701 of the display panel 160 and the second area 702 of the display panel 160. For example, as indicated by the line 765 in the chart 760, a viewing angle of each of the point f in the line 705 and the point g in the line 705 may be a j (herein, j is a real number lower than i), which is a viewing angle of the first area 701 of the display panel 160 targeted (or set) according to the input. For example, a viewing angle of a first portion 741 of the line 705 positioned between the point e and the point f corresponding to the second area 702 of the display panel 160 performing the second pixel processing may vary through a position between i and j. For example, a viewing angle of a second portion 742 of the line 705 positioned between the point g and the point h corresponding to the second area 702 of the display panel 160 performing the second pixel processing may vary through a position between i and j. For example, the DPU 212 (or the display driver circuitry 221) may perform the second pixel processing with respect to the second area 702 of the display panel 160, based on tapering an intensity of the filter applied to the second area 702 of the display panel 160 from a higher intensity near the first area 701 of the display panel 160 to a lower intensity peripheral to the second area 702 of the display panel 160.

FIG. 7 illustrates performing the second pixel processing with respect to the second area 702 of the display panel 160, but this is only exemplary. For example, the DPU 212 (or the display driver circuitry 221) may perform the second pixel processing with respect to a peripheral area (e.g., positioned in the first area 701 of the display panel 160) of the first area 701 of the display panel 160, and may perform the first pixel processing with respect to a remaining area of the first area 701 of the display panel 160 excluding the peripheral area of the first area 701 of the display panel 160.

FIG. 7 illustrates a width w1 corresponding to a first portion 731 of a line 704 is same as a width w2 corresponding to a second portion 732 of the line 704, and a width w3 corresponding to the first portion 741 of the line 705 is the same as a width w4 corresponding to the second portion 742 of the line 705, but this is only exemplary. For example, the width w1 may be different from the width w2. For example, the width w3 may be different from the width w4. For example, at least one of the width w1, the width w2, the width w3, and the width w4 may be different from at least another one of the width w1, the width w2, the width w3, and the width w4.

Figure 8:
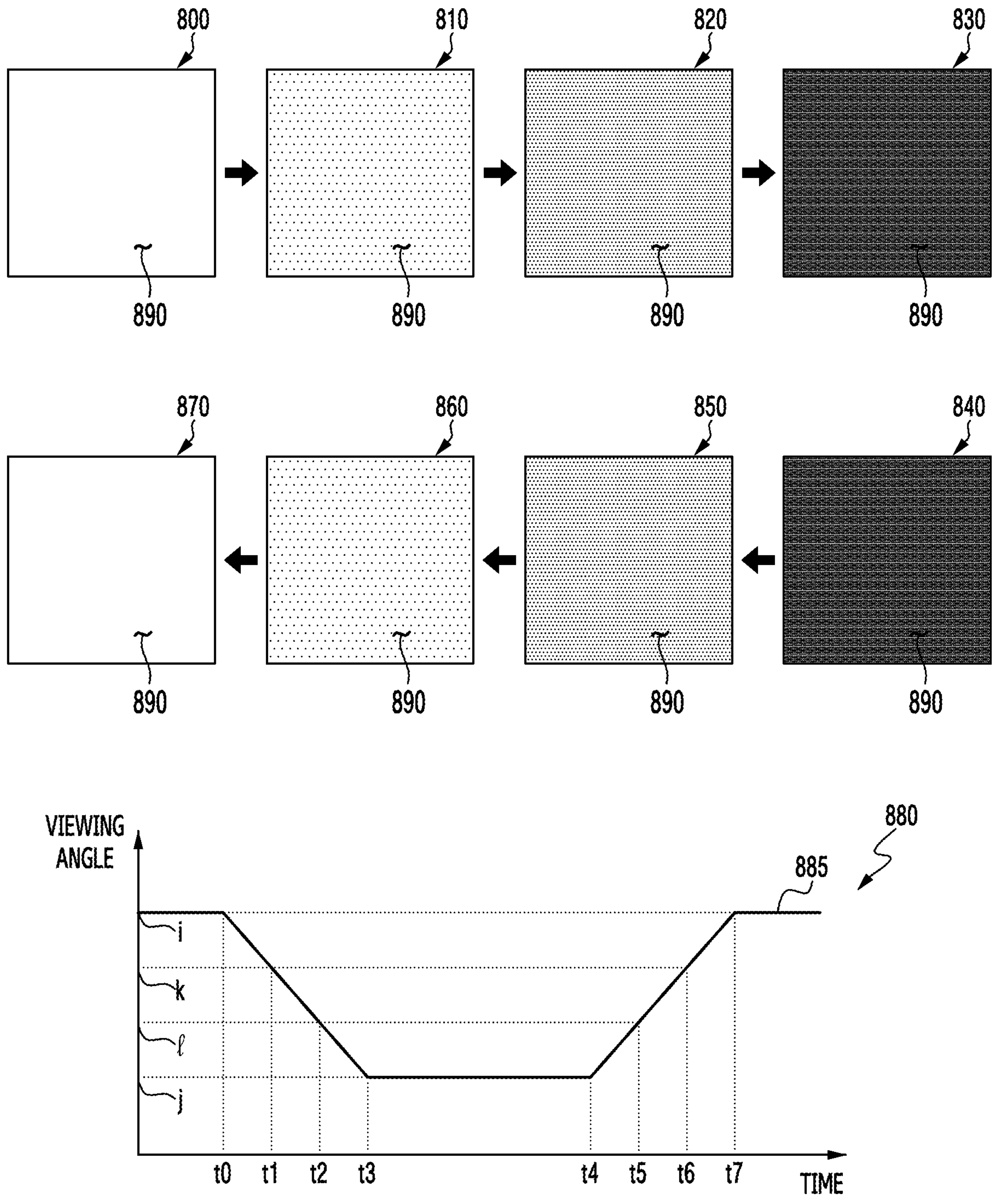
FIG. 8 illustrates a temporal transition in a pixel processing performed to apply a filter for user privacy to a portion of an active area of a display panel according to an embodiment of the disclosure.

FIG. 8 illustrates a temporal transition in a pixel processing performed to apply a filter for user privacy to a portion of an active area of a display panel according to an embodiment of the disclosure.

Referring to FIG. 8, the temporal transition may indicate performing a third pixel processing that applies a filter to an area 890 of the display panel 160 by gradually increasing an intensity of the filter for user privacy applied to the area 890 of the display panel 160 to a targeted intensity based on an input (or a setting) for applying the filter to the area 890 of the display panel 160, before performing a first pixel processing (e.g., the first pixel processing in the description of FIG. 7) that applies the filter to the area 890 of the display panel 160 with the targeted intensity. For example, based on the input, the DPU 212 (or the display driver circuitry 221) may perform the third pixel processing with respect to an area 890 of the display panel 160 based on applying the filter to the area 890 of the display panel 160 by increasing an intensity of the filter applied to the area 890 of the display panel 160 to a targeted (or set) intensity by the input (or the setting). For example, the DPU 212 (or the display driver circuitry 221) may perform the first pixel processing in response to performing the third pixel processing. For example, the third pixel processing may include the temporal transition. For example, the third pixel processing may be performed to compensate for a visual quality reduced by a difference between a viewing angle of the area 890 of the display panel 160 to which the filter is applied and a viewing angle of the area 890 of the display panel 160 to which the filter is applied with a targeted intensity. For example, a change in a viewing angle of the area 890 of the display panel 160 according to the third pixel processing may be represented as a chart 880.

A horizontal axis of the chart 880 indicates time, and a vertical axis of the chart 880 indicates a viewing angle of the area 890 of the display panel 160. A line 885 of the chart 880 indicates a viewing angle of the area 890 of the display panel 160 varying through time.

For example, at least one processor 210 (or CPU 211) may receive (or identify) an input indicating applying the filter to the area 890 of the display panel 160 at a time point to (or a timing t0) (or a time t0). For example, at the time point to, a viewing angle of the area 890 of the display panel 160 may be an I, which is a viewing angle of the display panel 160 before receiving (or identifying) the input (or a viewing angle of the display panel 160 without applying the filter), as indicated by the line 885 in the chart 880. For example, the area 890 of the display panel 160 may be represented as a state 800 at the time point to.

For example, the DPU 212 (or the display driver circuitry 221) may perform a third pixel processing with respect to the area 890 of the display panel 160 from the time point to, based on the input. In accordance with performing the third pixel processing, at a time point t1, a viewing angle of the area 890 of the display panel 160 may be a k, which is lower than i, as indicated by the line 885 in the chart 880. For example, the area 890 of the display panel 160 may be represented as a state 810 at the time point t1. In accordance with performing the third pixel processing, at a time point t2, a viewing angle of the area 890 of the display panel 160 may be an l, which is lower than k, as indicated by the line 885 in the chart 880. For example, the area 890 of the display panel 160 may be represented as a state 820 at the time point t2. In accordance with performing the third pixel processing, at a time point t3, a viewing angle of the area 890 of the display panel 160 may be a j, which is a viewing angle set according to the input (e.g., corresponding to an intensity of the filter set according to the input) and lower than 1, as indicated by the line 885 in the chart 880. For example, the third pixel processing may be completed (or terminated) at the time point t3. For example, the area 890 of the display panel 160 may be represented as a state 830 at the time point t3.

As a non-limiting example, a length of a time interval from the time point t0 to the time point t3 may vary according to a size of the area 890, a type of a visual content (or an image) provided through the area 890, a size of the visual content, and/or a targeted intensity of the filter applied to the area 890 (e.g., corresponding to the viewing angle j). For example, when the targeted intensity is a first intensity, the length of the time interval may be a first length, and when the targeted intensity is a second intensity different from the first intensity, the length of the time interval may be a second length different from the first length. For example, when a size of the area 890 is a first size, the length of the time interval may be a first length, and when the size of the area 890 is a second size different from the first size, the length of the time interval may be a second length different from the first length.

For example, the DPU 212 (or the display driver circuitry 221) may perform the first pixel processing with respect to the area 890 of the display panel 160 after completion (or termination) of the third pixel processing, based on the input. For example, a viewing angle of the area 890 of the display panel 160 according to the first pixel processing may be maintained as a j during a time interval between the time point t3 and the time point t4, as indicated by the line 885 in the chart 880.

The temporal transition may further indicate performing a fourth pixel processing of gradually decreasing an intensity of the filter applied to the area 890 of the display panel 160 from the targeted intensity before releasing the filter applied to the area 890 of the display panel 160, based on another input (or another setting) for releasing the filter applied to the area 890 of the display panel 160. For example, the DPU 212 (or the display driver circuitry 221) may perform the fourth pixel processing with respect to the area 890 of the display panel 160 based on gradually decreasing an intensity of the filter applied to the area 890 of the display panel 160 from the targeted intensity, based on the other input. For example, the fourth pixel processing may include the temporal transition. For example, the fourth pixel processing may be performed to compensate for a visual quality reduced by a difference between a viewing angle of the area 890 of the display panel 160 without the filter applied and a viewing angle of the area 890 of the display panel 160 with the filter applied with the targeted intensity. For example, a change in the viewing angle of the area 890 of the display panel 160 according to the fourth pixel processing may be represented as the chart 880.

For example, the at least one processor 210 (or the CPU 211) may receive (or identify) another input indicating releasing the filter applied to the area 890 of the display panel 160 at the time point t4. For example, a viewing angle of the area 890 of the display panel 160 at the time point t4 may be a j, which is a viewing angle of the display panel 160 before receiving (or identifying) the other input (or a viewing angle of the display panel 160 with the filter applied according to the first pixel processing), as represented by the line 885 in the chart 880. For example, the area 890 of the display panel 160 may be represented as a state 840 at the time point t4.

For example, the DPU 212 (or the display driver circuitry 221) may perform the fourth pixel processing with respect to the area 890 of the display panel 160 from the time point t4, based on the other input. In accordance with performing the fourth pixel processing, at a time point t5, a viewing angle of the area 890 of the display panel 160 may be 1, as indicated by the line 885 in the chart 880. For example, the area 890 of the display panel 160 may be represented, at a time point t5, as a state 850. In accordance with performing the fourth pixel processing, at a time point t6, a viewing angle of the area 890 of the display panel 160 may be k, as indicated by the line 885 in the chart 880. For example, the area 890 of the display panel 160 may be represented, at the time point t6, as a state 860. In accordance with performing the fourth pixel processing, at a time point t7, a viewing angle of the area 890 of the display panel 160 may be i, as indicated by the line 885 in the chart 880. For example, the fourth pixel processing may be completed (or terminated) at the time point t7. For example, the area 890 of the display panel 160 may be represented, at the time point t7, as a state 870.

Referring back to FIG. 2, a mode of the filter for user privacy applied (or provided) according to a pixel processing performed by the DPU 212 or the display driver circuitry 221 may include a first mode and/or a second mode.

The first mode may be described as an area mode. The first mode may indicate a mode of the filter provided, based on an input (or a setting) for applying the filter to an area of the display panel 160. For example, the first mode may be described as a mode of maintaining applying the filter to the area of the display panel 160, independently of a movement of a layer of an image displayed on the area of the display panel 160 identified (or selected) by the input. For example, the first mode may be described as a mode of maintaining applying the filter to the area of the display panel 160, independently of stopping displaying a layer of an image on the area of the display panel 160 identified by the input. As a non-limiting example, the second pixel processing, the third pixel processing, and/or the fourth pixel processing described with reference to FIGS. 7 and 8 may be performed for the first mode. The first mode is described with reference to FIGS. 9 and 10.

Figure 9:
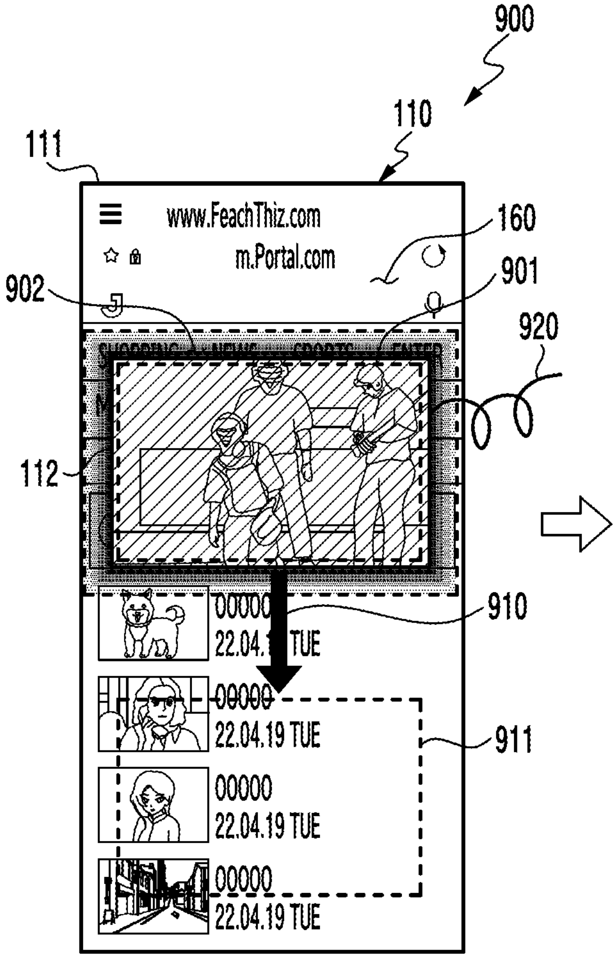
FIG. 9 illustrates a first mode of a filter for user privacy according to an embodiment of the disclosure.

FIG. 9 illustrates a first mode of a filter for user privacy according to an embodiment of the disclosure.

Referring to FIG. 9, the display driver circuitry 221 (or the DPU 212) may display an image 110 on the display panel 160 as in a state 900. The image 110 may include a first layer 111 and a second layer 112 positioned on a first portion of the first layer 111 to overlap the first layer 111.

In the state 900, the at least one processor 210 (or the CPU 211) may receive (or identify) an input (or a setting) associated with the filter. For example, the at least one processor 210 (or the CPU 211) may identify the input as an input for applying the filter to a first area 901 of the display panel 160. For example, the DPU 212 may perform the first pixel processing with respect to the first area 901 of the display panel 160 according to the first mode, based on the input identified as for applying the filter to the first area 901 of the display panel 160. As a non-limiting example, the first area 901 of the display panel 160 may be an area of the display panel 160 displaying a second layer 112 of the image 110. For example, the DPU 212 may control the display panel 160 to perform a pixel processing (e.g., the first pixel processing) with respect to the first area 901 of the display panel 160 to narrow a viewing angle of the second layer 112 of the image 110 displayed on the first area 901 of the display panel 160, based on the input identified as for applying the filter to the first area 901 of the display panel 160.

For example, the DPU 212 may perform the second pixel processing with respect to a second area 902 of the display panel 160 around the first area 901 of the display panel 160 according to the first mode, based on the input identified as for applying the filter to the first area 901 of the display panel 160. As a non-limiting example, the second area 902 of the display panel 160 may be an area of the display panel 160 displaying a second portion of a first layer 111 of the image 110 not overlapping the second layer 112 of the image 110. For example, the DPU 212 may control the display panel 160 to perform a pixel processing (e.g., the second pixel processing) with respect to the second area 902 of the display panel 160 to narrow a viewing angle of the second portion of the first layer 111 of the image 110 displayed on the second area 902 of the display panel 160, based on the input identified as for applying the filter to the first area 901 of the display panel 160. For example, a viewing angle of the second portion of the first layer 111 of the image 110 may be tapered (or reduced) from a wider viewing angle peripheral to the second portion of the first layer 111 of the image 110 to a narrower viewing angle near the second layer 112 of the image 110, based on tapering the intensity of the filter applied to the second area 902 of the display panel 160.

For example, the DPU 212 may perform the third pixel processing with respect to the first area 901 of the display panel 160 before performing the first pixel processing with respect to the first area 901 of the display panel 160 according to the first mode, based on the input identified as for applying the filter to the first area 901 of the display panel 160. For example, the DPU 212 may control the display panel 160 to perform a pixel processing (e.g., the third pixel processing) with respect to the first area 901 of the display panel 160 by gradually increasing an intensity of the filter applied to the first area 901 of the display panel 160 to a targeted intensity to narrow a viewing angle of the second layer 112 of the image 110, based on the input identified as for applying the filter to the first area 901 of the display panel 160.

For example, in the state 900, the at least one processor 210 (or the CPU 211) may receive an input 910 for moving the second layer 112 of the image 110 to a third area 911 of the display panel 160, while applying the filter to the first area 901 of the display panel 160 (or the first area 901 of the display panel 160 and the second area 902 of the display panel 160) according to the first mode. The state 900 may be changed or switched to a state 950 according to the input 910.

In the state 950, the DPU 212 may maintain applying the filter to the first area 901 of the display panel 160 (or the first area 901 of the display panel 160 and the second area 902 of the display panel 160) according to the first mode, independently of moving the second layer 112 of the image 110 to the third area 911 of the display panel 160 based on the input 910. For example, the DPU 212 may control the display panel 160 to narrow a viewing angle of the first portion of the first layer 111 of the image 110 (or the first portion of the first layer 111 of the image 110 and the second portion of the first layer 111 of the image 110) according to the first mode.

For example, in the state 900, the at least one processor 210 (or the CPU 211) may receive an input 920 for stopping displaying the second layer 112 of the image 110, while applying the filter to the first area 901 of the display panel 160 (or the first area 901 of the display panel 160 and the second area 902 of the display panel 160) according to the first mode. For example, the DPU 212 may maintain applying the filter to the first area 901 of the display panel 160 (or the first area 901 of the display panel 160 and the second area 902 of the display panel 160) according to the first mode, independently of stopping displaying the second layer 112 of the image 110 based on the input 920. For example, the DPU 212 may control the display panel 160 to narrow a viewing angle of the first portion of the first layer 111 of the image 110 (or the first portion of the first layer 111 of the image 110 and the second portion of the first layer 111 of the image 110) according to the first mode.

For example, one or more pixel processings for the filter (e.g., including the first pixel processing, including the first pixel processing and the second pixel processing, including the first pixel processing and the third pixel processing, or including the first pixel processing, the second pixel processing, and the third pixel processing) may be performed by the display driver circuitry 221 according to the first mode. For example, the at least one processor 210 (or the CPU 211) (or the DPU 212) may transmit, to the display driver circuitry 221, at least one command according to the input identified as for applying the filter to the first area 901 of the display panel 160. The at least one command according to the input identified as for applying the filter to the first area 901 of the display panel 160 may be described as at least one command for the first mode. The at least one command for the first mode may include first information indicating whether to enable the first mode, second information indicating whether to enable applying the filter to one or more areas (e.g., the first area 901 of the display panel 160) of the display panel 160 when enabling the first mode, and/or third information indicating a position of each of the one or more areas of the display panel 160 to which the filter is applied.

For example, the display driver circuitry 221 may perform the first pixel processing with respect to the first area 901 of the display panel 160 according to the first mode, based on receiving the at least one command for the first mode from the at least one processor 210, in the state 900. For example, the display driver circuitry 221 may narrow a viewing angle of the second layer 112 of the image 110 in accordance with performing a pixel processing (e.g., the first pixel processing) with respect to the first area 901 of the display panel 160. For example, the display driver circuitry 221 may perform the second pixel processing with respect to the second area 902 of the display panel 160 in accordance with the first mode, based on receiving the at least one command for the first mode from the at least one processor 210. For example, the DPU 212 may narrow a viewing angle of the second portion of the first layer 111 of the image 110 in accordance with performing a pixel processing (e.g., the second pixel processing) with respect to the second area 902 of the display panel 160, based on receiving the at least one command for the first mode from the at least one processor 210. For example, a viewing angle of the second portion of the first layer 111 of the image 110 may be tapered (or reduced) from a wider viewing angle peripheral to the second portion of the first layer 111 of the image 110 to a narrower viewing angle near the second layer 112 of the image 110, based on tapering the intensity of the filter applied to the second area 902 of the display panel 160.

For example, the display driver circuitry 221 may perform the third pixel processing with respect to the first area 901 of the display panel 160 before performing the first pixel processing with respect to the first area 901 of the display panel 160, according to the first mode, based on receiving the at least one command for the first mode from the at least one processor 210. For example, the display driver circuitry 221 may perform a pixel processing (e.g., the third pixel processing) that gradually increases an intensity of the filter applied to the first area 901 of the display panel 160 to a targeted intensity to narrow a viewing angle of the second layer 112 of the image 110, based on receiving the at least one command for the first mode from the at least one processor 210.

For example, in the state 900, the at least one processor 210 (or the CPU 211) may receive the input 910 of moving the second layer 112 of the image 110 to the third area 911 of the display panel 160, while applying the filter to the first area 901 of the display panel 160 (or the first area 901 of the display panel 160 and the second area 902 of the display panel 160) according to the first mode. The state 900 may be changed or switched to a state 950 according to the input 910.

In the state 950, the display driver circuitry 221 may maintain applying the filter to the first area 901 of the display panel 160 (or the first area 901 of the display panel 160 and the second area 902 of the display panel 160) according to the first mode, independently of moving the second layer 112 of the image 110 to the third area 911 of the display panel 160 based on the input 910. For example, the display driver circuitry 221 may control the display panel 160 to narrow a viewing angle of the first portion of the first layer 111 of the image 110 (or the first portion of the first layer 111 of the image 110 and the second portion of the first layer 111 of the image 110) according to the first mode.

For example, in the state 900, the at least one processor 210 (or the CPU 211) may receive the input 920 for stopping displaying the second layer 112 of the image 110, while applying the filter to the first area 901 of the display panel 160 (or the first area 901 of the display panel 160 and the second area 902 of the display panel 160) according to the first mode. For example, the display driver circuitry 221 may maintain applying the filter to the first area 901 of the display panel 160 (or the first area 901 of the display panel 160 and the second area 902 of the display panel 160) according to the first mode, independently of stopping displaying the second layer 112 of the image 110 based on the input 920. For example, the display driver circuitry 221 may narrow a viewing angle of the first portion of the first layer 111 of the image 110 (or the first portion of the first layer 111 of the image 110 and the second portion of the first layer 111 of the image 110) according to the first mode.

As a non-limiting example, an area of the display panel 160 to which the filter is applied according to the first mode and another area of the display panel 160 to which the filter is applied according to the first mode may be restricted (or disallowed) from overlapping each other. This restriction is described with reference to FIG. 10.

Figure 10:
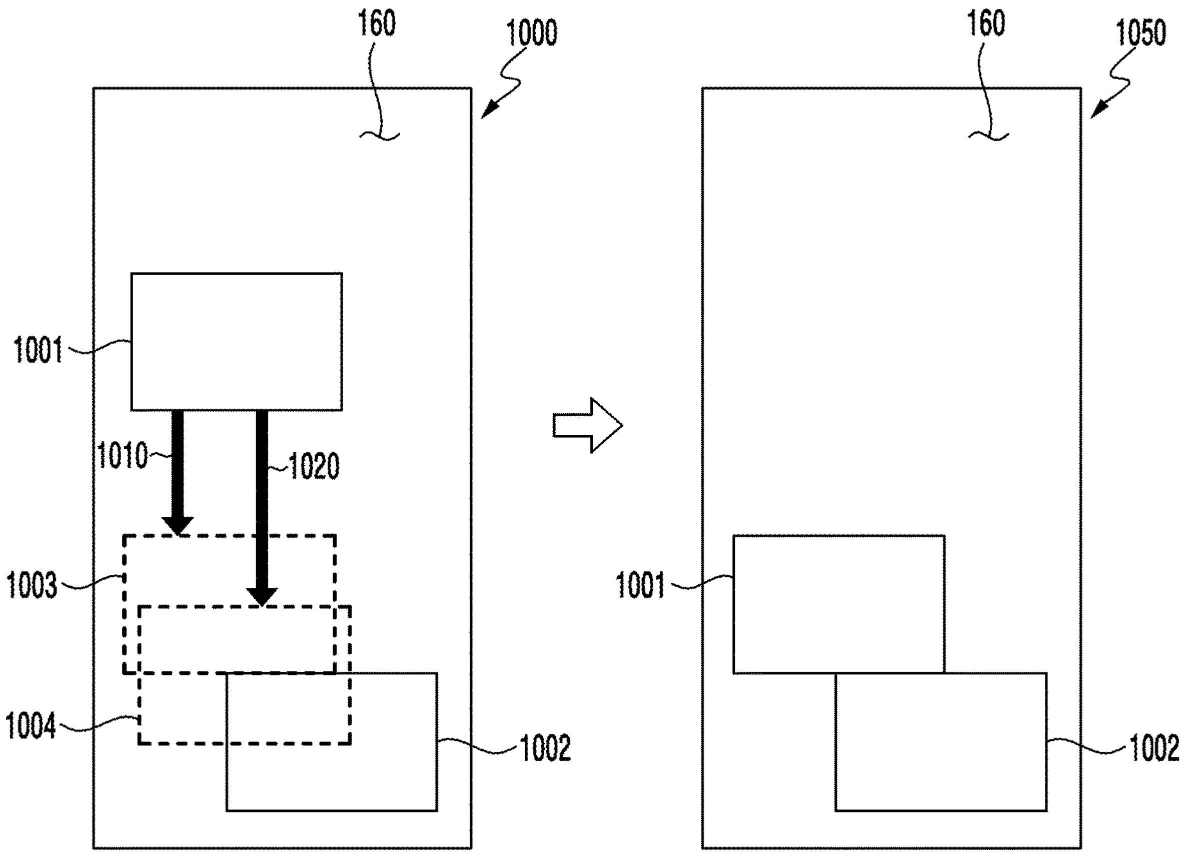
FIG. 10 illustrates an arrangement between areas of a display panel available (or usable) with respect to a first mode of a filter for user privacy according to an embodiment of the disclosure.

FIG. 10 illustrates an arrangement between areas of a display panel available (or usable) with respect to a first mode of a filter for user privacy according to an embodiment of the disclosure.

Referring to FIG. 10, in a state 1000, the DPU 212 (or the display driver circuitry 221) may apply the filter for user privacy to a first area 1001 of the display panel 160 according to the first mode. For example, the DPU 212 (or the display driver circuitry 221) may apply the filter to a second area 1002 of the display panel 160 (e.g., spaced apart from the first area 1001 of the display panel 160) according to the first mode, while applying the filter to the first area 1001 of the display panel 160 according to the first mode.

In the state 1000, the at least one processor 210 (or the CPU 211) may receive (or identify) an input 1010 (or a setting 1010) of changing (or moving) an area of the display panel 160, to which the filter is applied according to the first mode, from the first area 1001 of the display panel 160 to a third area 1003 of the display panel 160. As a non-limiting example, the input 1010 may be an input (or a setting) for additionally applying the filter to the third area 1003 of the display panel 160 according to the first mode, and for stopping applying the filter to the first area 1001 of the display panel 160 according to the first mode. The third area 1003 of the display panel 160 may indicate an area of the display panel 160 that is adjacent to the second area 1002 of the display panel 160 or in contact with the second area 1002 of the display panel 160. The third area 1003 of the display panel 160 may indicate an area of the display panel 160 not overlapping the second area 1002 of the display panel 160. For example, since the third area 1003 of the display panel 160, which is to be changed (or moved) from the first area 1001 of the display panel 160, does not overlap the second area 1002 of the display panel 160, the at least one processor 210 (or the CPU 211) may enable (or permit) transmitting at least one command (e.g., at least one command for the first mode) according to the input 1010 from the at least one processor 210 to the display driver circuitry 221. For example, the state 1000 may be changed or transitioned to a state 1050 based on the input 1010.

In the state 1050, the DPU 212 (or the display driver circuitry 221) may apply the filter to the third area 1003 of the display panel 160 (e.g., not overlapping the second area 1002 of the display panel 160) according to the first mode, while applying the filter to the second area 1002 of the display panel 160 according to the first mode.

In the state 1000, the at least one processor 210 (or the CPU 211) may receive (or identify) an input 1020 (or a setting 1020) for changing (or moving) an area of the display panel 160, to which the filter is applied according to the first mode, from the first area 1001 of the display panel 160 to a fourth area 1004 of the display panel 160. As a non-limiting example, the input 1020 may also be an input (or a setting) for additionally applying the filter to the fourth area 1004 of the display panel 160 according to the first mode and stopping applying the filter to the first area 1001 of the display panel 160 according to the first mode. The fourth area 1004 of the display panel 160 may indicate an area of the display panel 160 overlapping the second area 1002 of the display panel 160. For example, since the fourth area 1004 of the display panel 160 to be changed (or moved) from the first area 1001 of the display panel 160 overlaps the second area 1002 of the display panel 160, the at least one processor 210 (or the CPU 211) may disable (or disallow) transmitting at least one command (e.g., at least one command for the first mode) according to the input 1020, from the at least one processor 210 to the display driver circuitry 221. For example, the state 1000 may not be changed (or switched) to the state 1050 based on the input 1020. As a non-limiting example, the at least one processor 210 may disable transmitting the at least one command according to the input 1020 to the display driver circuitry 221, in order to restrict (or limit) an increase (or a rapid increase) (or an explosive increase) of a computation amount caused in the DPU 212 (or the display driver circuitry 221) by the second pixel processing (e.g., the second pixel processing described with reference to FIG. 7) performed according to the first mode with respect to two or more areas of the display panel 160 overlapping each other, the third pixel processing (e.g., the third pixel processing described with reference to FIG. 8) performed according to the first mode with respect to two or more areas of the display panel 160 overlapping each other, and/or the fourth pixel processing (e.g., the fourth pixel processing described with reference to FIG. 8) performed according to the first mode with respect to two or more areas of the display panel 160 overlapping each other.

Referring back to FIG. 2, the second mode may be described as a layer mode. The second mode may indicate a mode of the filter that is provided based on an input (or a setting) for applying the filter to a layer included in an image displayed on the display panel 160. For example, the second mode may be described as a mode of changing an area of the display panel 160 to which the filter is applied, according to a movement of the layer (e.g., included in the image) identified (or selected) by the input. For example, the second mode may be described as a mode of stopping applying the filter to an area of the display panel 160 displaying the layer, in accordance with stopping display of the layer identified by the input. As a non-limiting example, the second pixel processing, the third pixel processing, and/or the fourth pixel processing described with reference to FIGS. 7 and 8 may not be performed for the second mode. As a non-limiting example, in the second mode, the second pixel processing, the third pixel processing, and/or the fourth pixel processing may be restricted, unlike the first pixel processing. The second mode is described with reference to FIGS. 11 and 12.

Figure 11:
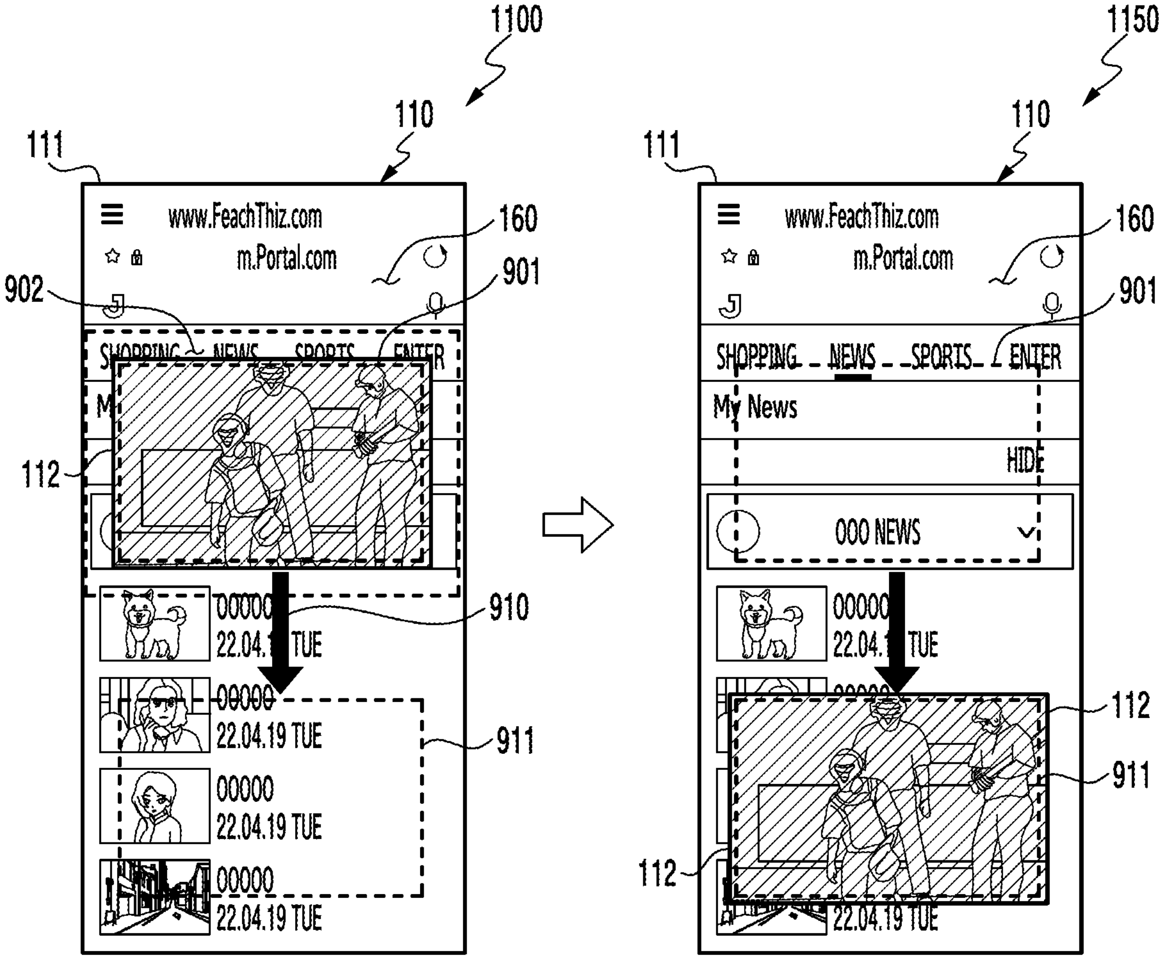
FIG. 11 illustrates a second mode of a filter for user privacy according to an embodiment of the disclosure.

FIG. 11 illustrates a second mode of a filter for user privacy according to an embodiment of the disclosure.

Referring to FIG. 11, the display driver circuitry 221 (or the DPU 212) may display an image 110 on the display panel 160, as in a state 1100. The image 110 may include a first layer 111 and a second layer 112 positioned on a first portion of the first layer 111 to overlap the first layer 111.

In the state 1100, the at least one processor 210 (or the CPU 211) may receive (or identify) an input (or a setting) associated with the filter. For example, the at least one processor 210 (or the CPU 211) may identify the input as an input for applying the filter to the second layer 112. For example, the DPU 212 may perform the first pixel processing with respect to a first area 901 of the display panel 160 displaying the second layer 112 of the image 110 according to the second mode, based on the input identified as for applying the filter to the second layer 112 of the image 110. For example, the DPU 212 may control the display panel 160 to perform a pixel processing (e.g., the first pixel processing) with respect to the first area 901 of the display panel 160, in order to narrow a viewing angle of the second layer 112 of the image 110, based on the input identified as for applying the filter to the second layer 112 of the image 110.

As a non-limiting example, since the second pixel processing is not applied in the second mode, the DPU 212 may refrain from performing the second pixel processing with respect to the second area 902 of the display panel 160 around the first area 901 of the display panel 160 according to the second mode, based on the input identified as for applying the filter to the second layer 112 of the image 110. As a non-limiting example, since the third pixel processing is not applied in the second mode, the DPU 212 may refrain from performing the third pixel processing with respect to the first area 901 of the display panel 160 displaying the second layer 112 of the image 110 before performing the first pixel processing with respect to the first area 901 of the display panel 160, based on the input identified as for applying the filter to the second layer 112 of the image 110.

For example, in the state 1100, the at least one processor 210 (or the CPU 211) may receive an input 910 for moving the second layer 112 of the image 110 to the third area 911 of the display panel 160, while applying the filter to the second layer 112 of the image 110 according to the second mode. The state 1100 may be changed or switched to a state 1150 according to the input 910.

In the state 1150, the second layer 112 of the image 110 may be positioned in the third area 911 of the display panel 160 based on the input 910. The DPU 212 may perform the first pixel processing with respect to the third area 911 of the display panel 160 displaying the second layer 112 of the image 110, in order to apply the filter to the second layer 112 of the image 110 moved based on the input 910, according to the second mode. The DPU 212 may stop performing the first pixel processing with respect to the first area 901 of the display panel 160 displaying the first portion of the first layer 111 of the image 110 in the state 1150, based on the input 910.

For example, one or more pixel processings for the filter (e.g., including the first pixel processing, including the first pixel processing and the second pixel processing, including the first pixel processing and the third pixel processing, or including the first pixel processing, the second pixel processing, and the third pixel processing) may be performed by the display driver circuitry 221 according to the second mode. For example, the at least one processor 210 (or the CPU 211) (or the DPU 212) may transmit, to the display driver circuitry 221, at least one command according to the input identified as for applying the filter to the second layer 112 of the image 110. The at least one command according to the input identified as for applying the filter to the second layer 112 of the image 110 may be described as at least one command for the second mode. The at least one command for the second mode may include first information indicating one or more layers (e.g., the second layer 112) in an image (e.g., the image 110) to which the filter is applied according to the second mode, and/or second information indicating a position of each of the one or more layers of the image to which the filter is applied.

For example, the display driver circuitry 221 may perform the first pixel processing with respect to the first area 901 of the display panel 160 displaying the second layer 112 of the image 110 according to the second mode, based on receiving the at least one command for the second mode from the at least one processor 210, in the state 1100. For example, the display driver circuitry 221 may narrow a viewing angle of the second layer 112 of the image 110 in accordance with performing a pixel processing (e.g., the first pixel processing) with respect to the first area 901 of the display panel 160 displaying the second layer 112 of the image 110.

For example, in the state 1100, the at least one processor 210 (or the CPU 211) may receive (or identify) the input 910 for moving the second layer 112 of the image 110 to the third area 911 of the display panel 160 while applying the filter to the second layer 112 of the image 110 according to the second mode. The state 1100 may be changed or switched to the state 1150 according to the input 910.

In the state 1150, the second layer 112 of the image 110 may be positioned within the third area 911 of the display panel 160, based on the input 910. For example, the at least one processor 210 (or the CPU 211) (or the DPU 212) may transmit, from the at least one processor 210 to the display driver circuitry 221, at least one command (or information) indicating that the second layer 112 of the image 110 to which the filter is applied according to the second mode is moved to the third area 911 of the display panel 160, based on the input 910. For example, the display driver circuitry 221 may perform the first pixel processing with respect to the third area 911 of the display panel 160 displaying the second layer 112 of the image 110, which is moved to the third area 911 of the display panel 160 in the state 1150, to apply the filter to the second layer 112 of the image 110, based on the at least one command (or according to the second mode). For example, the display driver circuitry 221 may stop performing the first pixel processing with respect to the first area 901 of the display panel 160 displaying the first portion of the first layer 111 of the image 110 in the state 1150, based on the at least one command (or according to the second mode).

As a non-limiting example, overlapping of a layer of an image to which the filter is applied according to the second mode and another layer of the image to which the filter is applied according to the second mode may be allowed. This allowance is described with reference to FIG. 12.

Figure 12:
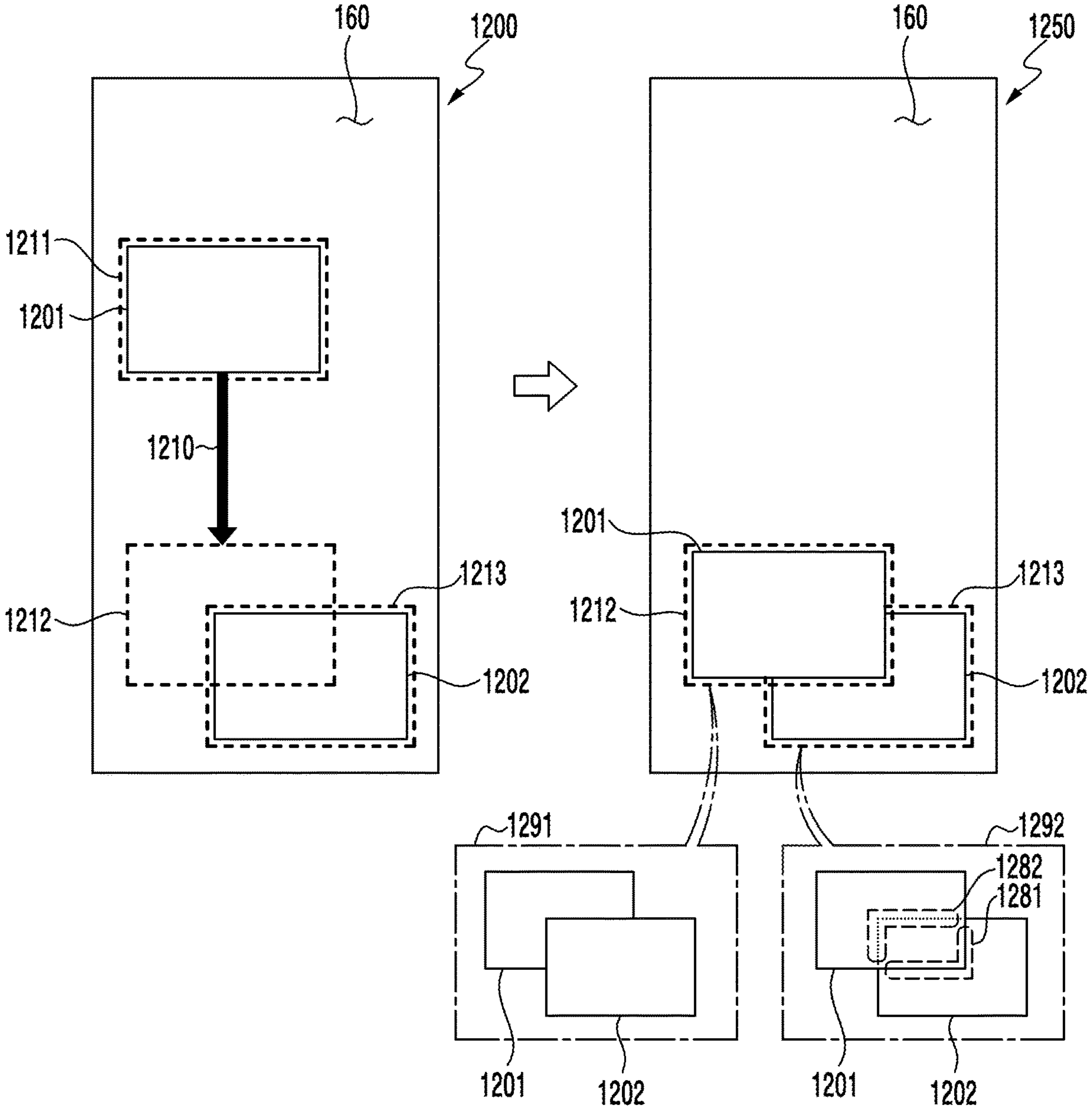
FIG. 12 illustrates an arrangement between layers in an image on a display panel available (or usable) with respect to a second mode of a filter for user privacy according to an embodiment of the disclosure.

FIG. 12 illustrates an arrangement between layers in an image on a display panel available (or usable) with respect to a second mode of a filter for user privacy according to an embodiment of the disclosure.

Referring to FIG. 12, in a state 1200, the DPU 212 (or display driver circuitry 221) may apply the filter for user privacy to a first layer 1201 of an image according to the second mode. For example, the DPU 212 (or the display driver circuitry 221) may, while applying the filter to the first layer 1201 of the image according to the second mode, apply the filter to a second layer 1202 of the image (e.g., spaced apart from the first layer 1201 of the image) according to the second mode.

In the state 1200, the at least one processor 210 (or the CPU 211) may receive (or identify) an input 1210 (or a setting 1210) for moving the first layer 1201 of the image, to which the filter is applied according to the second mode, from a first area 1211 of the display panel 160 to a second area 1212 of the display panel 160. The second area 1212 of the display panel 160 may indicate an area of the display panel 160 overlapping with a third area 1213 of the display panel 160 displaying the second layer 1202 of the image. Since overlapping two or more layers to which the filter is applied is allowed in the second mode, the at least one processor 210 (or the CPU 211) may enable transmitting at least one command according to the input 1210 from the at least one processor 210 to the display driver circuitry 221. For example, since overlapping two or more layers to which the filter is applied is allowed in the second mode, the state 1200 may be changed or switched to a state 1250 based on the input 1210.

In the state 1250, the DPU 212 (or the display driver circuitry 221) may display the first layer 1201 of the image in the second area 1212 of the display panel 160. The DPU 212 (or the display driver circuitry 221) may perform the first pixel processing with respect to the second area 1212 of the display panel 160 displaying the first layer 1201 of the image, in order to apply the filter to the first layer 1201 of the image, according to the second mode. The DPU 212 (or the display driver circuitry 221) may perform the first pixel processing with respect to a third area 1213 of the display panel 160 displaying the second layer 1202 of the image, in order to apply the filter to the second layer 1202 of the image, according to the second mode. For example, since overlapping two or more layers of an image to which the filter is applied is allowed in the second mode, the first layer 1201 of the image to which the filter is applied according to the second mode may overlap the second layer 1202 of the image to which the filter is applied according to the second mode.

For example, the second mode may allow overlapping two or more layers of an image to which the filter is applied, but the second pixel processing, the third pixel processing, and/or the fourth pixel processing described above may be unavailable (or restricted) in the second mode.

For example, a stacking order of layers (e.g., the first layer 1201 and the second layer 1202 in the state 1250) of the image to which the filter is applied according to the second mode may be at least temporarily reversed according to a state of a composition list for the image, as in a state 1291. For example, when the third pixel processing and/or the fourth pixel processing is executed in a state in which the stacking order is reversed, the filter applied to a layer among the layers of the image according to the second mode may be at least temporarily released. For example, since performing the third pixel processing and/or the fourth pixel processing to apply the filter according to the second mode with respect to layers of the image overlapping with each other may cause a malfunction associated with the filter in at least one of the layers of the image, the second mode may disallow the third pixel processing and/or the fourth pixel processing.

For example, the second mode may disallow (or restrict) the second pixel processing. For example, when the first layer 1201 of an image and the second layer 1202 of the image overlap each other, a portion 1281 of a periphery of the first layer 1201 of the image may be positioned on the second layer 1202 of the image, and a portion 1282 of a periphery of the second layer 1202 of the image may be positioned below the first layer 1201 of the image, as in the state 1292. For example, since performing the second pixel processing with respect to an area of the display panel 160 associated with the portion 1281 of the periphery of the first layer 1201 of the image and an area of the display panel 160 associated with the portion 1282 of the periphery of the second layer 1202 of the image may cause an increase (or a rapid increase) (or an explosive increase) in a computation amount caused in the DPU 212 (or the display driver circuitry 221), the second mode may disallow (or restrict) the second pixel processing.

Referring back to FIG. 2, an area of the display panel 160 to which the filter for user privacy is applied according to the first mode and a layer in an image on the display panel 160 to which the filter is applied according to the second mode may overlap each other. The area of the display panel 160 and the layer in the image overlapping each other are described with reference to FIGS. 13 and 14.

Figure 13:
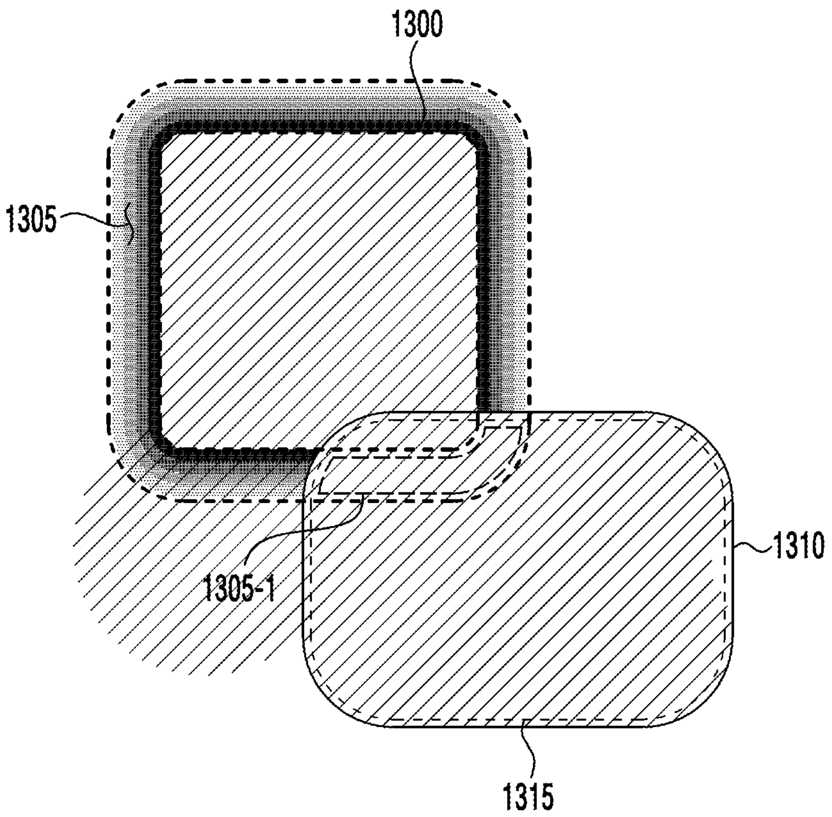
FIGS. 13 and 14 illustrate an area of a display panel according to a first mode and a layer in an image on a display panel according to a second mode overlap each other according to various embodiments of the disclosure.
Figure 14:
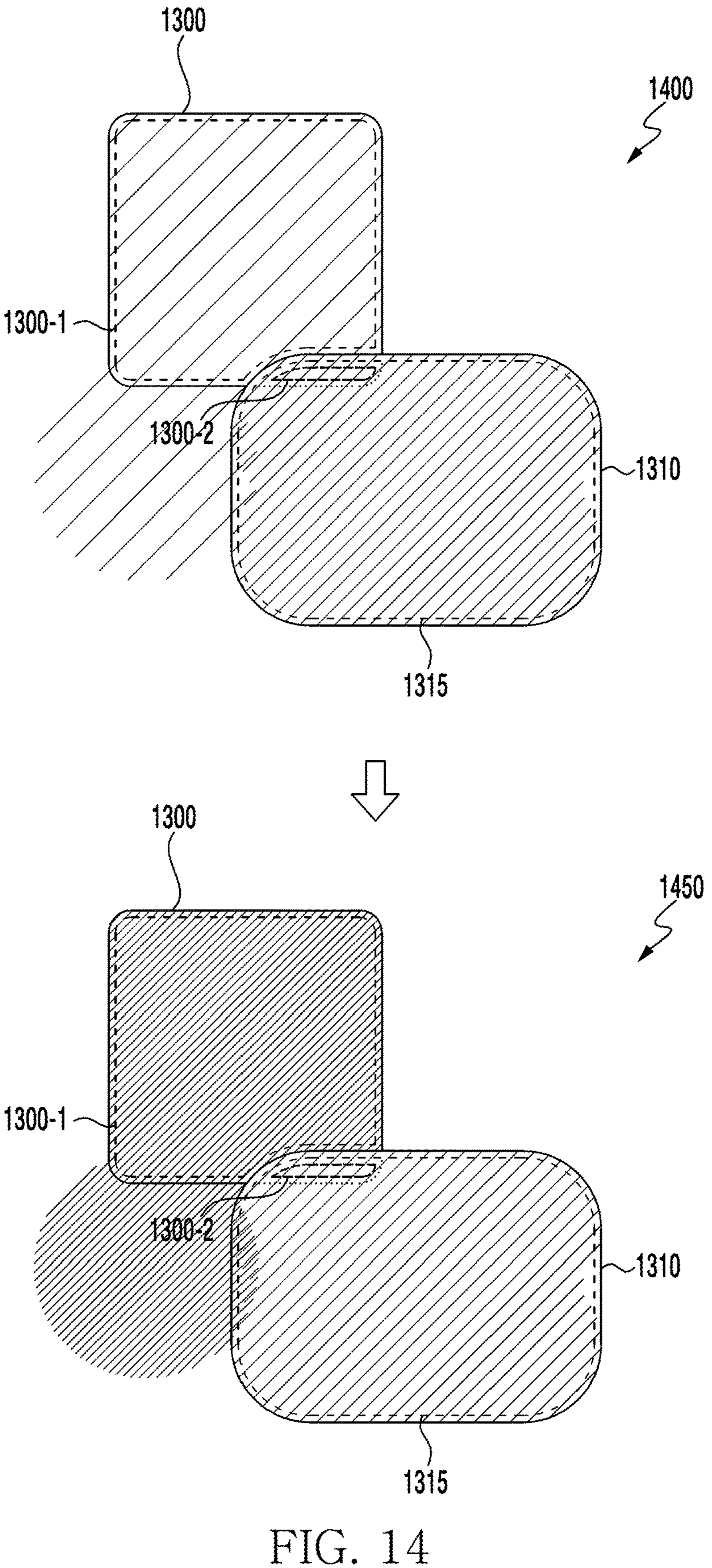

FIGS. 13 and 14 illustrate an area of a display panel according to a first mode and a layer in an image on a display panel according to a second mode overlap each other according to various embodiments of the disclosure.

Referring to FIG. 13, the DPU 212 (or the display driver circuitry 221) may perform the first pixel processing with respect to an area 1315 of the display panel 160 displaying a layer 1310 of an image, based on an input for applying the filter to a layer 1310 of the image on the display panel 160 according to the second mode. Based on an input for applying the filter to an area 1300 of the display panel 160 according to the first mode, the DPU 212 (or the display driver circuitry 221) may perform the first pixel processing with respect to the area 1300 of the display panel 160 and may perform the second pixel processing with respect to a portion of an area 1305 of the display panel 160 around the area 1300 of the display panel 160. The portion of the area 1305 of the display panel 160 may not overlap the area 1315 of the display panel 160 that displays the layer 1310 of the image to which the filter is applied according to the second mode. As a non-limiting example, the DPU 212 (or the display driver circuitry 221) may refrain from performing the second pixel processing with respect to another portion 1305-1 (or a remaining portion 1305-1) of the area 1305 of the display panel 160 overlapping the area 1315 of the display panel 160 that displays the layer 1310 of the image to which the filter is applied according to the second mode.

For example, the at least one processor 210 (or the CPU 211) may receive an input for applying the filter to the area 1300 of the display panel 160 partially overlapping the area 1315 of the display panel 160 according to the first mode, while applying the filter to the layer 1310 of the image on the display panel 160 according to the second mode. Since overlapping the area of the display panel 160 to which the filter is applied according to the first mode and the layer of the image on the display panel 160 to which the filter is applied according to the second mode is allowed, the at least one processor 210 may enable transmitting at least one command according to the input, from the at least one processor 210 to the display driver circuitry 221.

For example, the at least one processor 210 (or the CPU 211) may receive an input for applying the filter to the layer 1310 of the image displayed on the area 1315 of the display panel 160 partially overlapping the area 1300 (and/or the area 1305) of the display panel 160 according to the second mode, while applying the filter to the area 1300 of the display panel 160 according to the first mode. Since overlapping the area of the display panel 160 to which the filter is applied according to the first mode and the layer of the image on the display panel 160 to which the filter is applied according to the second mode is allowed, the at least one processor 210 may enable transmitting at least one command according to the input, from the at least one processor 210 to the display driver circuitry 221.

Referring to FIG. 14, the DPU 212 (or the display driver circuitry 221) may perform the first pixel processing with respect to the area 1315 of the display panel 160 displaying the layer 1310 of the image, based on an input for applying the filter to the layer 1310 of the image on the display panel 160 according to the second mode. Based on an input for applying the filter to the area 1300 of the display panel 160 according to the first mode, the DPU 212 (or the display driver circuitry 221) may perform the third pixel processing with respect to a portion 1300-1 of the area 1300 of the display panel 160, and may perform the first pixel processing with respect to the area 1300 of the display panel 160 after the third pixel processing. The portion 1300-1 of the area 1300 of the display panel 160 may not overlap the area 1315 of the display panel 160 displaying the layer 1310 of the image to which the filter is applied according to the second mode. For example, the DPU 212 (or the display driver circuitry 221) may refrain from performing the third pixel processing with respect to another portion 1300-2 (or a remaining portion 1300-2) of the area 1300 of the display panel 160 that overlaps the area 1315 of the display panel 160 displaying the layer 1310 of the image to which the filter is applied according to the second mode.

For example, according to the third pixel processing performed with respect to the portion 1300-1 of the area 1300 of the display panel 160, an intensity of the filter applied to the portion 1300-1 of the area 1300 of the display panel 160 may be changed. For example, in a state 1400, the DPU 212 (or the display driver circuitry 221) may apply the filter to the portion 1300-1 of the area 1300 of the display panel 160 with a first intensity. For example, in a state 1450 changed from the state 1400, the DPU 212 (or the display driver circuitry 221) may apply the filter to the portion 1300-1 of the area 1300 of the display panel 160 with a second intensity higher than the first intensity. As a non-limiting example, since the third pixel processing is disallowed in the second mode, an intensity of the filter applied to the layer 1310 of the image may be maintained independently of a change from the state 1400 to the state 1450.

For example, the at least one processor 210 (or the CPU 211) may receive an input for applying the filter to the area 1300 of the display panel 160 partially overlapping the area 1315 of the display panel 160 according to the first mode, while applying the filter to the layer 1310 of the image on the display panel 160 according to the second mode. Since overlapping an area of the display panel 160 to which the filter is applied according to the first mode and a layer of an image on the display panel 160 to which the filter is applied according to the second mode is allowed, the at least one processor 210 may enable transmitting at least one command according to the input, from the at least one processor 210 to the display driver circuitry 221.

For example, the at least one processor 210 (or the CPU 211) may receive an input for applying the filter to the layer 1310 of the image displayed on the area 1315 of the display panel 160 partially overlapping the area 1300 of the display panel 160 according to the second mode, while applying the filter to the area 1300 of the display panel 160 according to the first mode. Since overlapping an area of the display panel 160 to which the filter is applied according to the first mode and a layer of an image on the display panel 160 to which the filter is applied according to the second mode is allowed, the at least one processor 210 may enable transmitting at least one command according to the input, from the at least one processor 210 to the display driver circuitry 221.

As a non-limiting example, while applying the filter to the area 1300 of the display panel 160 and not applying the filter to the layer 1310 of the image, the at least one processor 210 (or the CPU 211) may receive an input for applying the filter to the area 1315 of the display panel 160 displaying the layer 1310 of the image according to the first mode. For example, the input may be received after completing performing the third pixel processing with respect to the area 1300 of the display panel 160. For example, the input may be received while performing the first pixel processing with respect to the area 1300 of the display panel 160. For example, since the input is received after performing the first pixel processing, the area 1315 of the display panel 160 overlaps the area 1300 of the display panel 160, but the at least one processor 210 (or the CPU 211) may enable transmitting, from the at least one processor 210 to the display driver circuitry 221, at least one command according to the input for applying the filter to the area 1315 of the display panel 160 according to the first mode. For example, the DPU 212 or the display driver circuitry 221 may perform the third pixel processing with respect to the area 1315 of the display panel 160 based on the input and/or the at least one command, and may perform the first pixel processing with respect to the area 1315 of the display panel 160 based on completing the third pixel processing.

As a non-limiting example, while applying the filter to the area 1300 of the display panel 160 and not applying the filter to the layer 1310 of the image, the at least one processor 210 (or the CPU 211) may receive an input for applying the filter to the area 1315 of the display panel 160 displaying the layer 1310 of the image according to the first mode. For example, since the first mode disallows overlapping between areas of the display panel 160, the at least one processor 210 (or the CPU 211) may recognize the input for applying the filter to the area 1315 of the display panel 160 displaying the layer 1310 of the image according to the first mode as an input for applying the filter to the layer 1310 of the image according to the second mode. For example, based on the recognition, the at least one processor 210 (or the CPU 211) may transmit, from the at least one processor 210 to the display driver circuitry 221, at least one command for applying the filter to the layer 1310 of the image according to the second mode. For example, the DPU 212 or the display driver circuitry 221 may perform the first pixel processing with respect to the area 1315 of the display panel 160, by applying the filter to the layer 1310 of the image according to the second mode, based on the at least one command.

As a non-limiting example, while applying the filter to the area 1300 of the display panel 160 and not applying the filter to the layer 1310 of the image, the at least one processor 210 (or the CPU 211) may receive an input for applying the filter to the area 1315 of the display panel 160 displaying the layer 1310 of the image according to the first mode. For example, the at least one processor 210 (or the CPU 211) may perform a movement of the layer 1310 of the image based on the input, according to identifying that the area 1300 of the display panel 160 and the area 1315 of the display panel 160 overlap each other. For example, the layer 1310 of the image may be moved to an area of the display panel 160 not overlapping the area 1315 of the display panel 160 based on the input. For example, the DPU 212 or the display driver circuitry 221 may perform the third pixel processing with respect to the area of the display panel 160 displaying the layer 1310 of the image for which the movement is completed, and may perform the first pixel processing with respect to the area of the display panel 160 displaying the layer 1310 of the image, based on completing performing of the third pixel processing. For example, the DPU 212 or the display driver circuitry 221 may apply the filter to the area of the display panel 160 according to the first mode, after the movement of the layer 1310 of the image is completed.

Referring back to FIG. 2, the operations described with reference to FIGS. 7 to 14 may be performed (or executed) by at least using functional components included in the DPU 212 or the display driver circuitry 221. The functional components are described with reference to FIG. 15.

Figure 15:
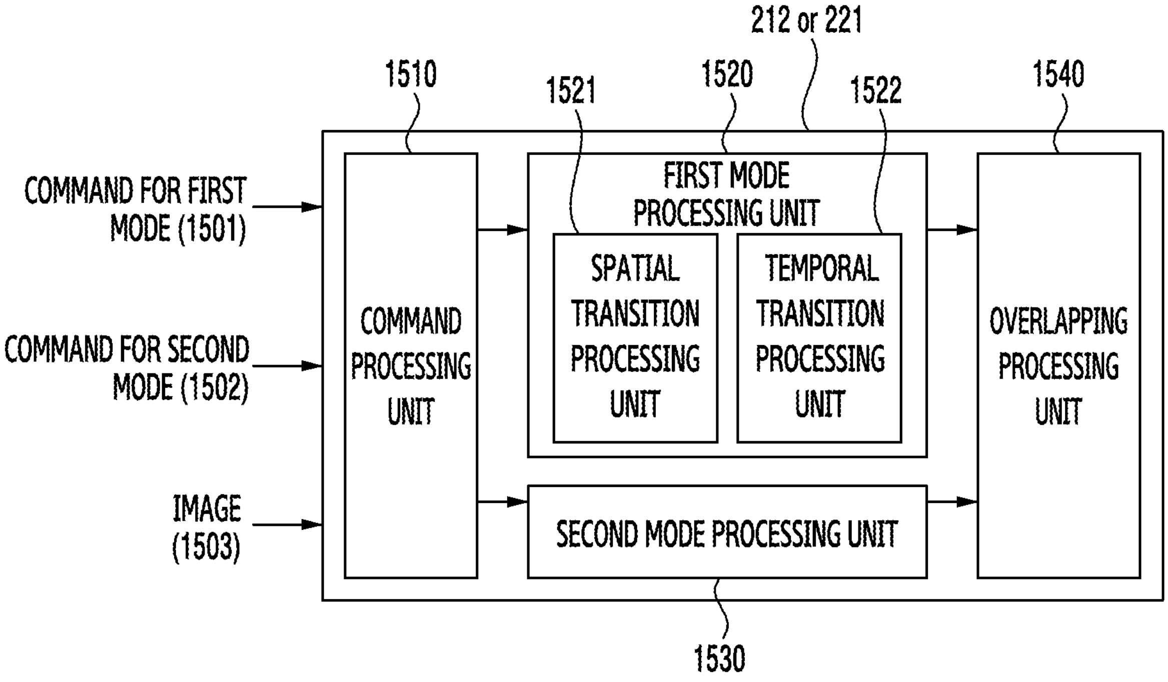
FIG. 15 illustrates functional components for a filter for user privacy according to an embodiment of the disclosure.

FIG. 15 illustrates functional components for a filter for user privacy according to an embodiment of the disclosure.

Referring to FIG. 15, the DPU 212 or the display driver circuitry 221 may include a functional component for the filter for user privacy.

For example, the DPU 212 or the display driver circuitry 221 may include a command processing unit 1510, a first mode processing unit 1520, a second mode processing unit 1530, and an overlapping processing unit 1540. As a non-limiting example, one or more of the command processing unit 1510, the first mode processing unit 1520, the second mode processing unit 1530, and the overlapping processing unit 1540 may be implemented as processing circuitry within the DPU 212 or the display driver circuitry 221. As a non-limiting example, one or more of the command processing unit 1510, the first mode processing unit 1520, the second mode processing unit 1530, and the overlapping processing unit 1540 may be implemented as one or more software programs stored in memory (e.g., the memory of the electronic device 100 described in the description of FIG. 2) for the DPU 212 or the display driver circuitry 221. That one or more of the command processing unit 1510, the first mode processing unit 1520, the second mode processing unit 1530, and the overlapping processing unit 1540 implemented as one or more software applications are included in the DPU 212 or the display driver circuitry 221 may be described as the one or more of the command processing unit 1510, the first mode processing unit 1520, the second mode processing unit 1530, and the overlapping processing unit 1540 implemented as one or more software applications being executed in the DPU 212 or the display driver circuitry 221.

The command processing unit 1510 may be used to provide a command received from the at least one processor 210 (or the CPU 211) to another functional component in the DPU 212 or the display driver circuitry 221. For example, the command processing unit 1510 may receive a command 1501 for the first mode from the at least one processor 210 (or the CPU 211). For example, the command processing unit 1510 may provide the command 1501 for the first mode to the first mode processing unit 1520. For example, the command processing unit 1510 may receive a command 1502 for the second mode from the at least one processor 210 (or the CPU 211). For example, the command processing unit 1510 may provide the command 1502 for the second mode to the second mode processing unit 1530.

The first mode processing unit 1520 may be used to apply the filter to an area of the display panel 160 according to the first mode, based on the command 1501 for the first mode from the command processing unit 1510. For example, the first mode processing unit 1520 may perform the first pixel processing with respect to the area of the display panel 160 displaying an image 1503 received from the at least one processor 210 (or the CPU 211). For example, the first mode processing unit 1520 may perform the second processing with respect to another area of the display panel 160 around the area of the display panel 160 displaying the image 1503 received from the at least one processor 210 (or the CPU 211). For example, the second processing may be performed through a spatial transition processing unit 1521 in the first mode processing unit 1520. For example, the first mode processing unit 1520 may perform the third pixel processing with respect to the area of the display panel 160 displaying the image 1503 received from the at least one processor 210 (or the CPU 211), before performing the first pixel processing with respect to the area of the display panel 160. For example, the first mode processing unit 1520 may perform the fourth pixel processing with respect to the area of the display panel 160 displaying the image 1503 received from the at least one processor 210 (or the CPU 211) in accordance with identifying releasing of the filter applied to the area of the display panel 160 based on the command 1501 for the first mode. For example, the third pixel processing performed before performing the first pixel processing and the fourth pixel processing performed after performing the first pixel processing may be performed through a temporal transition processing unit 1522 in the first mode processing unit 1520.

The second mode processing unit 1530 may be used to apply the filter to a layer of the image 1503 on the display panel 160 according to the second mode, based on the command 1502 for the second mode from the command processing unit 1510. For example, the second mode processing unit 1530 may perform the first pixel processing with respect to an area of the display panel 160 displaying the layer of the image 1503. For example, the second mode processing unit 1530 may identify applying the filter to two or more layers of the image 1503 overlapping each other, based on the command 1502 for the second mode from the command processing unit 1510, and may apply the filter to the two or more layers of the image 1503 overlapping each other according to the identification.

The overlapping processing unit 1540 may be used when an area of the display panel 160 (e.g., displaying the image 1503 received from the at least one processor 210 or the CPU 211) to which the filter is applied according to the first mode, and a layer of the image 1503 to which the filter is applied according to the second mode overlap each other. For example, the overlapping processing unit 1540 may be used to perform operations described with reference to FIGS. 13 and 14. For example, the overlapping processing unit 1540 may process at least a portion of the area of the display panel 160 overlapping with the layer of the image 1503 according to the second mode.

Referring back to FIG. 2, the filter for user privacy may be applied according to a manual setting of the filter, and may also be applied according to an automatic setting of the filter. The manual setting of the filter is described with reference to FIG. 16, and the automatic setting of the filter is described with reference to FIGS. 17 and 18.

Figure 16:
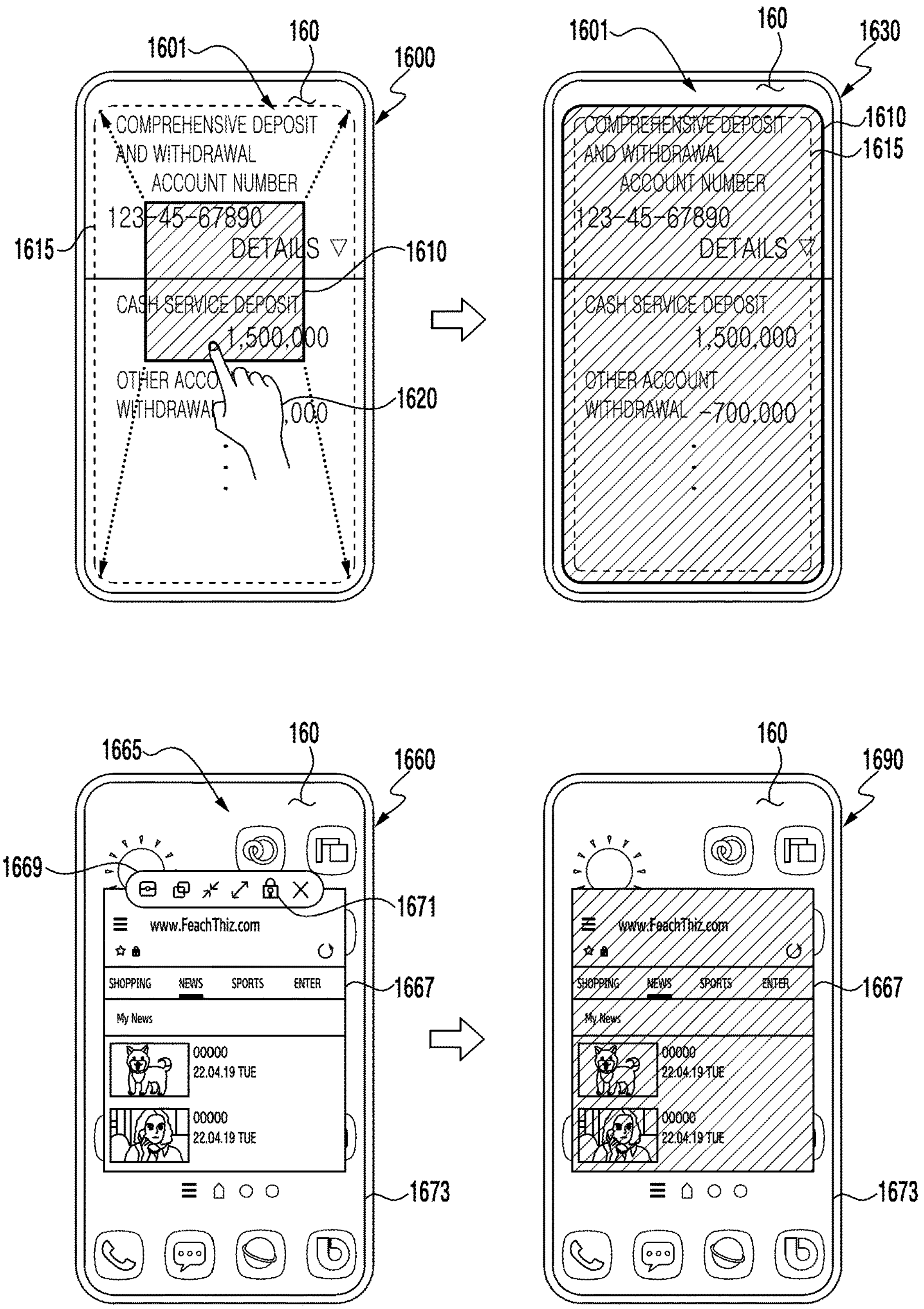
FIG. 16 illustrates a manual setting of a filter for user privacy according to an embodiment of the disclosure.

FIG. 16 illustrates a manual setting of a filter for user privacy according to an embodiment of the disclosure.

Referring to FIG. 16, the manual setting of the filter for user privacy may be used for the first mode. For example, in a state 1600, the DPU 212 (or the display driver circuitry 221) may display an image 1601 on the display panel 160. For example, the DPU 212 (or the display driver circuitry 221) may display, on the display panel 160, an object 1610 for identifying (or determining) (or selecting) an area of the display panel 160 to which the filter is applied according to the first mode, as superimposed on (or as floated on) the image 1601. For example, the at least one processor 210 (or the CPU 211) may receive an input 1620 with respect to the object 1610. As a non-limiting example, the input 1620 may include a pinch-to-zoom gesture (or pinch-to-out gesture) on the display panel 160, a multi-swipe gesture (or multi-swiping gesture), a touch input on the display panel 160 maintained for a reference time, or a tap input having an intensity greater than a reference intensity.

For example, the at least one processor 210 (or the CPU 211) may determine (or identify) the area 1615 of the display panel 160 as the area of the display panel 160 to which the filter is applied according to the first mode, based on the input 1620. As a non-limiting example, for determining (or identifying) the area 1615, a trained model (e.g., an artificial intelligence model) included in the electronic device 100 may be further used. For example, the at least one processor 210 (or the CPU 211) may determine the area 1615 of the display panel 160, based on information generated or obtained by the trained model and the input 1620. For example, the information may include data for one or more contents associated with user privacy identified by the trained model among contents in the image 1601. For example, the information may be used to partially correct an area indicated by the input 1620.

For example, the state 1600 may be changed or switched to a state 1630 based on the input 1620. In the state 1630, the DPU 212 (or the display driver circuitry 221) may apply the filter to the area 1615 of the display panel 160 according to the first mode, based on the determination. For example, the DPU 212 (or the display driver circuitry 221) may perform the first pixel processing with respect to the area 1615 of the display panel 160. For example, the DPU 212 (or the display driver circuitry 221) may perform the second pixel processing with respect to another area (not illustrated) of the display panel 160 around the area 1615 of the display panel 160. For example, the DPU 212 (or the display driver circuitry 221) may perform, before performing the first pixel processing with respect to the area 1615 of the display panel 160, the third pixel processing. Although not illustrated in FIG. 16, the DPU 212 (or the display driver circuitry 221) may perform the fourth pixel processing with respect to the area 1615 of the display panel 160 based on an input for terminating (or completing) (or stopping) the first pixel processing performed with respect to the area 1615, and may release (fully) the filter applied to the area 1615 based on the completion of the fourth pixel processing.

As a non-limiting example, the image 1601 may include a single layer for security. For example, the manual setting of the filter may be usable to apply the filter to at least a portion of the image 1601 including the single layer according to the first mode.

The manual setting of the filter for user privacy may be used for the second mode. For example, in a state 1660, the DPU 212 (or the display driver circuitry 221) may display an image 1665 on the display panel 160. The image 1665 may include a layer 1673, a layer 1667 superimposed on a portion of the layer 1673, and a layer 1669 superimposed on (or above) another portion of the layer 1673 and also superimposed on a portion of the layer 1667. For example, the at least one processor 210 (or the CPU 211) may receive an input for an object 1671 in the layer 1669 for applying the filter to the layer 1667. As a non-limiting example, the layer 1669 may further include an object for arranging the layer 1667 and the layer 1673 side by side so as not to overlap each other, an object for changing a transparency of the layer 1667, an object for minimizing a display of the layer 1667, an object for displaying the layer 1667 on the layer 1673 (or an object for maximizing the display of the layer 1667), and/or an object for stopping a display of the layer 1667. For example, the at least one processor 210 (or the CPU 211) may receive the input for the object 1671. For example, the at least one processor 210 (or the CPU 211) may determine (or identify) the layer 1667 as a layer of the image 1665 to which the filter is applied according to the second mode, based on the input. For example, the state 1660 may be changed or switched to a state 1690, based on the input for the object 1671.

In the state 1690, the DPU 212 (or the display driver circuitry 221) may apply the filter to the layer 1667 according to the second mode, based on the determination. For example, while displaying the layer 1667 to which the filter is applied, an additional layer having the same or similar shape as the layer 1669 may be displayed according to a user input. The additional layer may include an object for releasing the filter, unlike the layer 1669. For example, the filter applied to the layer 1667 may be released, based on a user input for the object.

Figure 17:
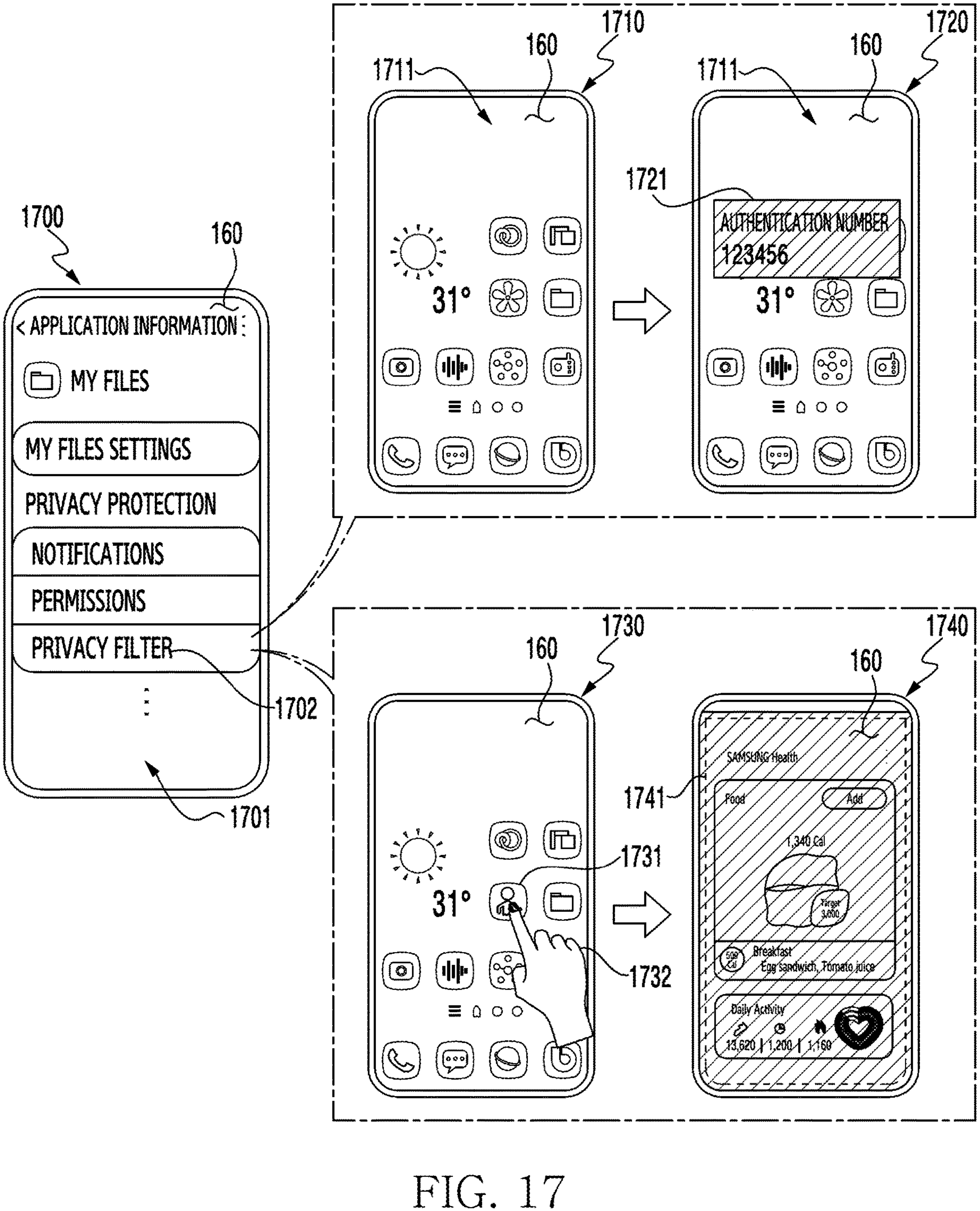
FIG. 17 illustrates an automatic setting of a filter for user privacy according to an embodiment of the disclosure.

FIG. 17 illustrates an automatic setting of a filter for user privacy according to an embodiment of the disclosure.

Referring to FIG. 17, in a state 1700, the DPU 212 (or the display driver circuitry 221) may display, on the display panel 160, a user interface 1701 for setting a software application stored in the electronic device 100. The user interface 1701 may include an executable object 1702. For example, the executable object 1702 may be used for a setting associated with the filter for user privacy. As a non-limiting example, the executable object 1702 may be usable (or available) for setting to apply the filter to one or more layers of an image generated (or obtained) by the software application. As a non-limiting example, the executable object 1702 may be usable for setting to apply the filter to a notification caused by the software application.

For example, applying the filter according to the second mode to the notification caused by the software application may be set through the executable object 1702. For example, in a state 1710, the DPU 212 (or the display driver circuitry 221) may display an image 1711 (e.g., a wallpaper) on the display panel 160. For example, the at least one processor 210 may identify an event caused by the software application. For example, the at least one processor 210 may generate or obtain a notification 1721 by using the software application, based on the event. For example, the at least one processor 210 may determine to display the notification 1721. For example, the state 1710 may be changed or switched to a state 1720, based on the event.

In the state 1720, the DPU 212 (or the display driver circuitry 221) may further display the notification 1721 on the display panel 160, based on the event. For example, the notification 1721 may be superimposed on a portion of the image 1711. For example, the DPU 212 (or the display driver circuitry 221) may apply the filter to the notification 1721, based on the setting through the executable object 1702 (or the user interface 1701).

As another example, applying the filter to a layer among layers of an image generated by the software application according to the second mode may be set through the executable object 1702. For example, in a state 1730, the DPU 212 (or the display driver circuitry 221) may display an image 1733 (e.g., a wallpaper) on the display panel 160. The image 1733 may include an object 1731 for executing the software application. For example, the at least one processor 210 may receive an input 1732 for the object 1731. For example, the at least one processor 210 may execute the software application based on the input 1732. For example, the state 1730 may be changed or switched to a state 1740 based on the input 1732.

In the state 1740, the DPU 212 (or the display driver circuitry 221) may display, on the display panel 160, an image 1741 (e.g., a user interface) generated by the software application executed based on the input 1732. For example, the DPU 212 (or the display driver circuitry 221) may apply the filter to the image 1741, based on the setting through the executable object 1702 (or the user interface 1701).

Figure 18:
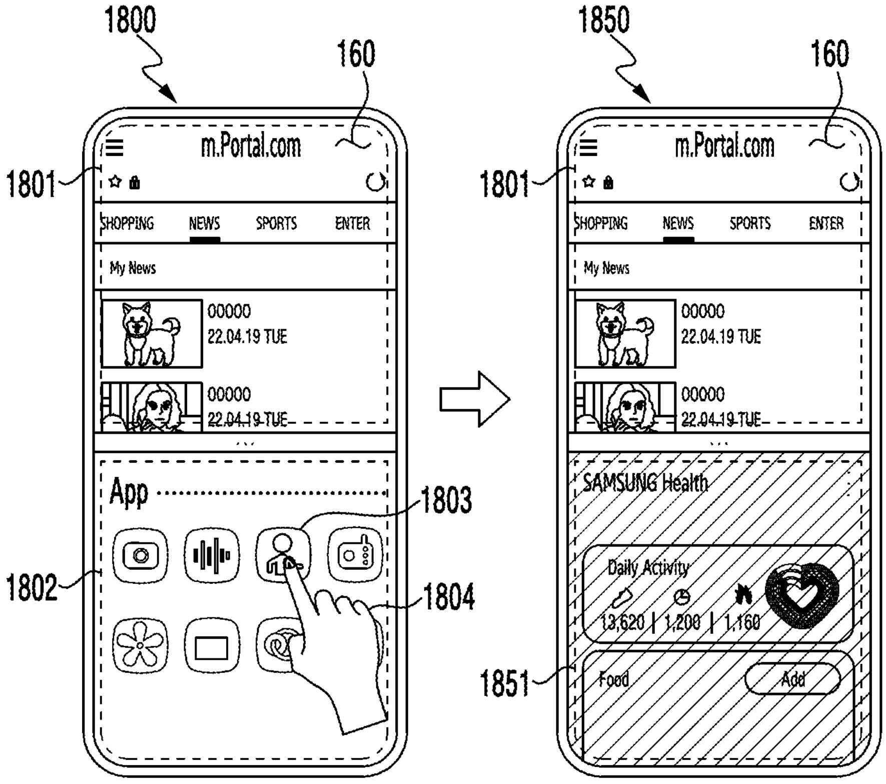
FIG. 18 illustrates an automatic setting of a filter for user privacy according to an embodiment of the disclosure.

FIG. 18 illustrates an automatic setting of a filter for user privacy according to an embodiment of the disclosure.

Referring to FIG. 18, applying the filter to a layer of an image displayed on a partial area of the display panel 160 according to the second mode may be set according to the automatic setting of the filter.

For example, in a state 1800, the DPU 212 (or the display driver circuitry 221) may simultaneously display, on the display panel 160, an image 1801 (e.g., a user interface) generated by a first software application and an image 1802 alongside the image 1801. The image 1802 may be a user interface for selecting (or determining) (or identifying) a software application that provides an image to be displayed alongside the image 1801. For example, the image 1802 may include an object 1803.

For example, the at least one processor 210 may receive an input 1804 for the object 1803 in the image 1802. For example, based on the input 1804, the at least one processor 210 may determine to display an image (e.g., an image 1851) generated (or obtained) by a second software application corresponding to the object 1803 within the partial area of the display panel 160 set according to the automatic setting. For example, the state 1800 may be changed or switched to a state 1850 based on the input 1804.

In the state 1850, the DPU 212 (or the display driver circuitry 221) may simultaneously display the image 1801 and the image 1851 alongside the image 1801. For example, the image 1851 may be displayed within the partial area of the display panel 160 set according to the automatic setting. For example, since the image 1851 is displayed within the partial area of the display panel 160 set according to the automatic setting, the DPU 212 (or the display driver circuitry 221) may apply the filter to the image 1851 displayed in the partial area of the display panel 160, according to the automatic setting.

Applying a filter for user privacy according to the manual setting described with reference to FIG. 16 may be performed simultaneously with applying a filter for user privacy according to the automatic setting described with reference to FIGS. 17 and 18. For example, while a filter for user privacy is applied with respect to a first portion of the display panel 160 according to the automatic setting, a filter for user privacy may be additionally applied with respect to a second portion of the display panel 160 according to the manual setting. For example, while a filter for user privacy is applied with respect to a first portion of the display panel 160 according to the manual setting, a filter for user privacy may be additionally applied with respect to a second portion of the display panel 160 according to the automatic setting.

The above operations may be executed by the electronic device 1901 (or components of the electronic device 1901) described with reference to FIGS. 19 and 20 below.

FIG. 19 is a block diagram illustrating an electronic device in a network environment according to an embodiment of the disclosure.

Referring to FIG. 19, an electronic device 1901 in a network environment 1900 may communicate with an external electronic device 1902 via a first network 1998 (e.g., a short-range wireless communication network), or at least one of an external electronic device 1904 or a server 1908 via a second network 1999 (e.g., a long-range wireless communication network). According to an embodiment of the disclosure, the electronic device 1901 may communicate with the external electronic device 1904 via the server 1908. According to an embodiment of the disclosure, the electronic device 1901 may include a processor 1920, memory 1930, an input module 1950, a sound output module 1955, a display module 1960, an audio module 1970, a sensor module 1976, an interface 1977, a connecting terminal 1978, a haptic module 1979, a camera module 1980, a power management module 1988, a battery 1989, a communication module 1990, a subscriber identification module (SIM) 1996, or an antenna module 1997. In some embodiments of the disclosure, at least one of the components (e.g., the connecting terminal 1978) may be omitted from the electronic device 1901, or one or more other components may be added in the electronic device 1901. In some embodiments of the disclosure, some of the components (e.g., the sensor module 1976, the camera module 1980, or the antenna module 1997) may be implemented as a single component (e.g., the display module 1960).

The processor 1920 may execute, for example, software (e.g., a program 1940) to control at least one other component (e.g., a hardware or software component) of the electronic device 1901 coupled with the processor 1920, and may perform various data processing or computation. According to an embodiment of the disclosure, as at least part of the data processing or computation, the processor 1920 may store a command or data received from another component (e.g., the sensor module 1976 or the communication module 1990) in volatile memory 1932, process the command or the data stored in the volatile memory 1932, and store resulting data in non-volatile memory 1934. According to an embodiment of the disclosure, the processor 1920 may include a main processor 1921 (e.g., a central processing unit (CPU) or an application processor (AP)), or an auxiliary processor 1923 (e.g., a graphics processing unit (GPU), a neural processing unit (NPU), an image signal processor (ISP), a sensor hub processor, or a communication processor (CP)) that is operable independently from, or in conjunction with, the main processor 1921. For example, when the electronic device 1901 includes the main processor 1921 and the auxiliary processor 1923, the auxiliary processor 1923 may be adapted to consume less power than the main processor 1921, or to be specific to a specified function. The auxiliary processor 1923 may be implemented as separate from, or as part of the main processor 1921.

The auxiliary processor 1923 may control at least some of functions or states related to at least one component (e.g., the display module 1960, the sensor module 1976, or the communication module 1990) among the components of the electronic device 1901, instead of the main processor 1921 while the main processor 1921 is in an inactive (e.g., a sleep) state, or together with the main processor 1921 while the main processor 1921 is in an active state (e.g., executing an application). According to an embodiment of the disclosure, the auxiliary processor 1923 (e.g., an image signal processor or a communication processor) may be implemented as part of another component (e.g., the camera module 1980 or the communication module 1990) functionally related to the auxiliary processor 1923. According to an embodiment of the disclosure, the auxiliary processor 1923 (e.g., the neural processing unit) may include a hardware structure specified for artificial intelligence model processing. An artificial intelligence model may be generated by machine learning. Such learning may be performed, e.g., by the electronic device 1901 where the artificial intelligence is performed or via a separate server (e.g., the server 1908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1930 may store various data used by at least one component (e.g., the processor 1920 or the sensor module 1976) of the electronic device 1901. The various data may include, for example, software (e.g., the program 1940) and input data or output data for a command related thereto. The memory 1930 may include the volatile memory 1932 or the non-volatile memory 1934.

The program 1940 may be stored in the memory 1930 as software, and may include, for example, an operating system (OS) 1942, middleware 1944, or an application 1946.

The input module 1950 may receive a command or data to be used by another component (e.g., the processor 1920) of the electronic device 1901, from the outside (e.g., a user) of the electronic device 1901. The input module 1950 may include, for example, a microphone, a mouse, a keyboard, a key (e.g., a button), or a digital pen (e.g., a stylus pen).

The sound output module 1955 may output sound signals to the outside of the electronic device 1901. The sound output module 1955 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 1960 may visually provide information to the outside (e.g., a user) of the electronic device 1901. The display module 1960 may include, for example, a display, a hologram device, or a projector and control circuitry to control a corresponding one of the display, hologram device, and projector. According to an embodiment of the disclosure, the display module 1960 may include a touch sensor adapted to detect a touch, or a pressure sensor adapted to measure the intensity of force incurred by the touch.

The audio module 1970 may convert a sound into an electrical signal and vice versa. According to an embodiment of the disclosure, the audio module 1970 may obtain the sound via the input module 1950, or output the sound via the sound output module 1955 or a headphone of an external electronic device (e.g., the external electronic device 1902) directly (e.g., wiredly) or wirelessly coupled with the electronic device 1901.

The sensor module 1976 may detect an operational state (e.g., power or temperature) of the electronic device 1901 or an environmental state (e.g., a state of a user) external to the electronic device 1901, and then generate an electrical signal or data value corresponding to the detected state. According to an embodiment of the disclosure, the sensor module 1976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1977 may support one or more specified protocols to be used for the electronic device 1901 to be coupled with the external electronic device (e.g., the external electronic device 1902) directly (e.g., wiredly) or wirelessly. According to an embodiment of the disclosure, the interface 1977 may include, for example, a high definition multimedia interface (HDMI), a universal serial bus (USB) interface, a secure digital (SD) card interface, or an audio interface.

A connecting terminal 1978 may include a connector via which the electronic device 1901 may be physically connected with the external electronic device (e.g., the external electronic device 1902). According to an embodiment of the disclosure, the connecting terminal 1978 may include, for example, an HDMI connector, a USB connector, an SD card connector, or an audio connector (e.g., a headphone connector).

The haptic module 1979 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 1979 may include, for example, a motor, a piezoelectric element, or an electric stimulator.

The camera module 1980 may capture a still image or moving images. According to an embodiment of the disclosure, the camera module 1980 may include one or more lenses, image sensors, image signal processors, or flashes.

The power management module 1988 may manage power supplied to the electronic device 1901. According to an embodiment of the disclosure, the power management module 1988 may be implemented as at least part of, for example, a power management integrated circuit (PMIC).

The battery 1989 may supply power to at least one component of the electronic device 1901. According to an embodiment of the disclosure, the battery 1989 may include, for example, a primary cell which is not rechargeable, a secondary cell which is rechargeable, or a fuel cell.

The communication module 1990 may support establishing a direct (e.g., wired) communication channel or a wireless communication channel between the electronic device 1901 and the external electronic device (e.g., the external electronic device 1902, the external electronic device 1904, or the server 1908) and performing communication via the established communication channel. The communication module 1990 may include one or more communication processors that are operable independently from the processor 1920 (e.g., the application processor (AP)) and supports a direct (e.g., wired) communication or a wireless communication. According to an embodiment of the disclosure, the communication module 1990 may include a wireless communication module 1992 (e.g., a cellular communication module, a short-range wireless communication module, or a global navigation satellite system (GNSS) communication module) or a wired communication module 1994 (e.g., a local area network (LAN) communication module or a power line communication (PLC) module). A corresponding one of these communication modules may communicate with the external electronic device via the first network 1998 (e.g., a short-range communication network, such as Bluetooth™, wireless-fidelity (Wi-Fi) direct, or infrared data association (IrDA)) or the second network 1999 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1992 may identify and authenticate the electronic device 1901 in a communication network, such as the first network 1998 or the second network 1999, using subscriber information (e.g., international mobile subscriber identity (IMSI)) stored in the subscriber identification module 1996.

The wireless communication module 1992 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1992 may support a high-frequency band (e.g., the millimeter wave (mmWave) band) to achieve, e.g., a high data transmission rate. The wireless communication module 1992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1992 may support various requirements specified in the electronic device 1901, an external electronic device (e.g., the external electronic device 1904), or a network system (e.g., the second network 1999). According to an embodiment of the disclosure, the wireless communication module 1992 may support a peak data rate (e.g., 20 Gbps or more) for implementing eMBB, loss coverage (e.g., 1964 dB or less) for implementing mMTC, or U-plane latency (e.g., 0.5 ms or less for each of downlink (DL) and uplink (UL), or a round trip of 19 ms or less) for implementing URLLC.

The antenna module 1997 may transmit or receive a signal or power to or from the outside (e.g., the external electronic device) of the electronic device 1901. According to an embodiment of the disclosure, the antenna module 1997 may include an antenna including a radiating element including a conductive material or a conductive pattern formed in or on a substrate (e.g., a printed circuit board (PCB)). According to an embodiment of the disclosure, the antenna module 1997 may include a plurality of antennas (e.g., array antennas). In such a case, at least one antenna appropriate for a communication scheme used in the communication network, such as the first network 1998 or the second network 1999, may be selected, for example, by the communication module 1990 (e.g., the wireless communication module 1992) from the plurality of antennas. The signal or the power may then be transmitted or received between the communication module 1990 and the external electronic device via the selected at least one antenna. According to an embodiment of the disclosure, another component (e.g., a radio frequency integrated circuit (RFIC)) other than the radiating element may be additionally formed as part of the antenna module 1997.

According to various embodiments of the disclosure, the antenna module 1997 may form a mmWave antenna module. According to an embodiment of the disclosure, the mm Wave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 1901 and the external electronic device 1904 via the server 1908 coupled with the second network 1999. Each of the external electronic devices 1902 or 1904 may be a device of a same type as, or a different type, from the electronic device 1901. According to an embodiment of the disclosure, all or some of operations to be executed at the electronic device 1901 may be executed at one or more of the external electronic devices 1902 or 1904, or the server 1908. For example, if the electronic device 1901 should perform a function or a service automatically, or in response to a request from a user or another device, the electronic device 1901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1901. The electronic device 1901 may provide the outcome, with or without further processing of the outcome, as at least part of a reply to the request. To that end, a cloud computing, distributed computing, mobile edge computing (MEC), or client-server computing technology may be used, for example. The electronic device 1901 may provide ultra low-latency services using, e.g., distributed computing or mobile edge computing. In another embodiment of the disclosure, the external electronic device 1904 may include an Internet-of-things (IOT) device. The server 1908 may be an intelligent server using machine learning and/or a neural network. According to an embodiment of the disclosure, the external electronic device 1904 or the server 1908 may be included in the second network 1999. The electronic device 1901 may be applied to intelligent services (e.g., a smart home, a smart city, a smart car, or healthcare) based on 5G communication technology or IoT-related technology.

Figure 20:
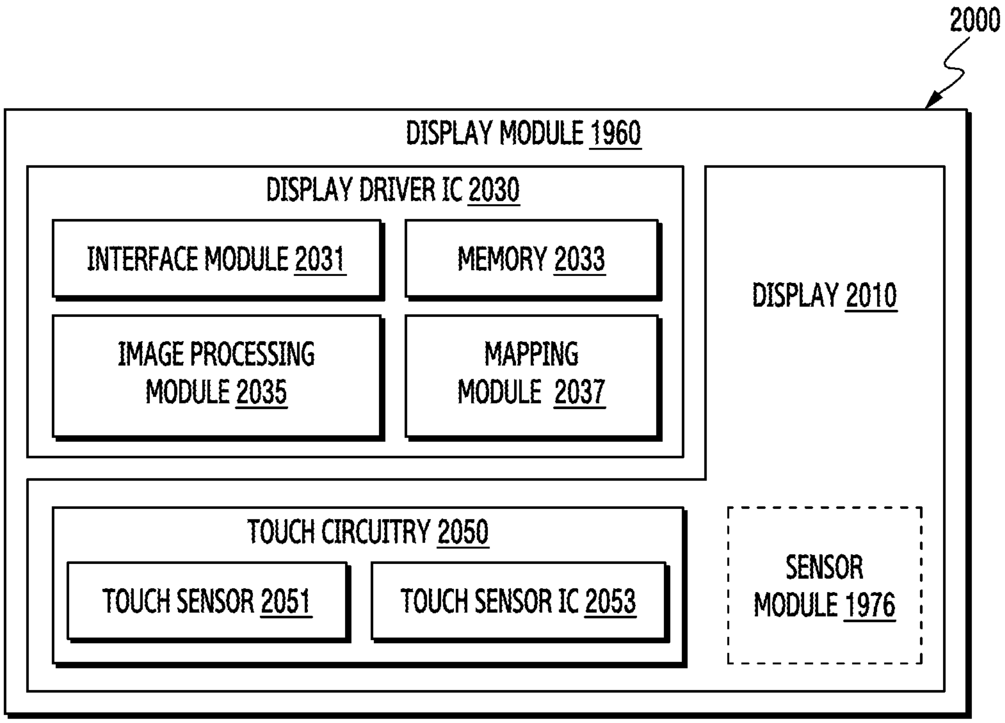
FIG. 20 is a block diagram of a display module according to an embodiment of the disclosure.

FIG. 20 is a block diagram 2000 illustrating a display module according to an embodiment of the disclosure.

Referring to FIG. 20, the display module 1960 may include a display 2010 and a display driver integrated circuit (DDI) 2030 to control the display 2010. The DDI 2030 may include an interface module 2031, memory 2033 (e.g., buffer memory), an image processing module 2035, or a mapping module 2037. The DDI 2030 may receive image information that contains image data or an image control signal corresponding to a command to control the image data from another component of the electronic device 1901 via the interface module 2031. For example, according to an embodiment of the disclosure, the image information may be received from the processor 1920 (e.g., the main processor 1921 (e.g., an application processor)) or the auxiliary processor 1923 (e.g., a graphics processing unit) operated independently from the function of the main processor 1921. The DDI 2030 may communicate, for example, with touch circuitry 2050 or the sensor module 1976 via the interface module 2031. The DDI 2030 may also store at least part of the received image information in the memory 2033, for example, on a frame by frame basis. The image processing module 2035 may perform pre-processing or post-processing (e.g., adjustment of resolution, brightness, or size) with respect to at least part of the image data. According to an embodiment of the disclosure, the pre-processing or post-processing may be performed, for example, based at least in part on one or more characteristics of the image data or one or more characteristics of the display 2010. The mapping module 2037 may generate a voltage value or a current value corresponding to the image data pre-processed or post-processed by the image processing module 2035. According to an embodiment of the disclosure, the generating of the voltage value or current value may be performed, for example, based at least in part on one or more attributes of the pixels (e.g., an array, such as a red, green, and blue (RGB) stripe or a pentile structure, of the pixels, or the size of each subpixel). At least some pixels of the display 2010 may be driven, for example, based at least in part on the voltage value or the current value such that visual information (e.g., a text, an image, or an icon) corresponding to the image data may be displayed via the display 2010.

According to an embodiment of the disclosure, the display module 1960 may further include the touch circuitry 2050. The touch circuitry 2050 may include a touch sensor 2051 and a touch sensor IC 2053 to control the touch sensor 2051. The touch sensor IC 2053 may control the touch sensor 2051 to detect a touch input or a hovering input with respect to a certain position on the display 2010. To achieve this, for example, the touch sensor 2051 may detect (e.g., measure) a change in a signal (e.g., a voltage, a quantity of light, a resistance, or a quantity of one or more electric charges) corresponding to the certain position on the display 2010. The touch circuitry 2050 may provide input information (e.g., a position, an area, a pressure, or a time) indicative of the touch input or the hovering input detected via the touch sensor 2051 to the processor 1920. According to an embodiment of the disclosure, at least part (e.g., the touch sensor IC 2053) of the touch circuitry 2050 may be formed as part of the display 2010 or the DDI 2030, or as part of another component (e.g., the auxiliary processor 1923) disposed outside the display module 1960.

According to an embodiment of the disclosure, the display module 1960 may further include at least one sensor (e.g., a fingerprint sensor, an iris sensor, a pressure sensor, or an illuminance sensor) of the sensor module 1976 or a control circuit for the at least one sensor. In such a case, the at least one sensor or the control circuit for the at least one sensor may be embedded in one portion of a component (e.g., the display 2010, the DDI 2030, or the touch circuitry 2050)) of the display module 1960. For example, when the sensor module 1976 embedded in the display module 1960 includes a biometric sensor (e.g., a fingerprint sensor), the biometric sensor may obtain biometric information (e.g., a fingerprint image) corresponding to a touch input received via a portion of the display 2010. As another example, when the sensor module 1976 embedded in the display module 1960 includes a pressure sensor, the pressure sensor may obtain pressure information corresponding to a touch input received via a partial or whole area of the display 2010. According to an embodiment of the disclosure, the touch sensor 2051 or the sensor module 1976 may be disposed between pixels in a pixel layer of the display 2010, or over or under the pixel layer.

The technical problems to be achieved in this document are not limited to those described above, and other technical problems not mentioned herein will be clearly understood by those having ordinary knowledge in the art to which the disclosure belongs, from the following description.

As described above, an electronic device (e.g., the electronic device 100) may comprise a display panel (e.g., the display panel 160). The display panel may be configured to adjust a viewing angle of at least a portion of an image displayed on the display panel. The electronic device may comprise display driver circuitry (e.g., the display driver circuitry 221), and at least one processor (e.g., the at least one processor 210) comprising processing circuitry. The display driver circuitry may be configured to display, on the display panel, an image including a first layer, and a second layer positioned on a first portion of the first layer to overlap the first layer; while displaying the image, receive, from the at least one processor, at least one command associated with a filter for user privacy; based on receiving, from the at least one processor, the at least one command according to a first input for applying the filter to the second layer of the image, narrow a viewing angle of the second layer of the image, in accordance with performing a pixel processing for the filter with respect to a first area of the display panel displaying the second layer of the image; based on receiving, from the at least one processor, the at least one command according to a second input for applying the filter to the first area of the display panel displaying the second layer of the image, narrow a viewing angle of a second portion of the first layer of the image and a viewing angle of the second layer of the image, in accordance with performing the pixel processing with respect to the first area of the display panel and a second area of the display panel around the first area of the display panel.

For example, the display driver circuitry may be configured to, based on tapering an intensity of the filter applied to the second area of the display panel from a higher intensity near the first area of the display panel to a lower intensity peripheral the second area of the display panel, perform the pixel processing with respect to the second area of the display panel.

For example, the viewing angle of the second portion of the first layer of the image may be tapered, based on tapering the intensity of the filter applied to the second area of the display panel from a higher intensity near the first area of the display panel, from a wider viewing angle peripheral the second portion of the first layer of the image to a narrower viewing angle near the second layer of the image.

For example, the electronic device may further comprise memory, storing instructions, comprising one or more storage media. When executed by the at least one processor individually or collectively, the instructions may cause the electronic device to, while narrowing the viewing angle of the second portion of the first layer of the image and the viewing angle of the second layer of the image based on receiving the at least one command according to the second input, disable transmitting, from the at least one processor to the display driver circuitry, at least one command according to a third input for applying the filter to a third area of the display panel at least partially overlapping the first area of the display panel, and enable transmitting, from the at least one processor to the display driver circuitry, at least one command according to a fourth input for applying the filter to a fourth area of the display panel not overlapping the first area of the display panel.

For example, when executed by the at least one processor individually or collectively, the instructions may cause the electronic device to, while narrowing the viewing angle of the second portion of the first layer of the image and the viewing angle of the second layer of the image based on receiving the at least one command according to the second input, enable transmitting, from the at least one processor to the display driver circuitry, at least one command according to a fifth input for applying the filter to the first layer of the image.

For example, the electronic device may further comprise memory, storing instructions, comprising one or more storage media. When executed by the at least one processor individually or collectively, the instructions may cause the electronic device to, while narrowing the viewing angle of the second layer of the image based on receiving the at least one command according to the first input, enable transmitting, from the at least one processor to the display driver circuitry, at least one command according to a third input for applying the filter to the first layer of the image overlapping the second layer of the image.

For example, when executed by the at least one processor individually or collectively, the instructions may cause the electronic device to, while narrowing the viewing angle of the second layer of the image based on receiving the at least one command according to the first input, enable transmitting, from the at least one processor to the display driver circuitry, at least one command according to a fourth input for applying the filter to a third area of the display panel at least partially overlapping the first area of the display panel displaying the second layer of the image.

For example, the display driver circuitry may be configured to maintain, independently of a movement of the second layer of the image, the pixel processing performed with respect to the first area of the display panel and the second area of the display panel based on receiving the at least one command according to the second input.

For example, the display driver circuitry may be configured to, based on the second layer of the image moved on a third portion of the first layer of the image while narrowing the viewing angle of the second layer of the image based on receiving the at least one command according to the first input, maintain narrowing the viewing angle of the second layer of the image in accordance with performing the pixel processing with respect to a third area of the display panel displaying the second layer of the image moved to the third portion of the first layer of the image.

For example, the pixel processing may be performed after performing one or more other pixel processing that adjust a data voltage provided to at least another sub-pixel in the display panel adjacent to a sub-pixel in the display panel in accordance with adjusting a data voltage provided to the sub-pixel in the display panel.

For example, the one or more other pixel processing may comprise performing an upscaling with respect to the image, performing an edge sharpening of at least one visual object included in the image, performing a blur processing with respect to at least a portion of the image, performing a high dynamic range (HDR) processing with respect to at least a portion of the image, performing a temporal dithering with respect to at least a portion of the image; and/or performing a spatial dithering with respect to at least a portion of the image.

For example, the plurality of pixels may comprise a plurality of organic light emitting diodes (OLEDs). For example, the pixel processing may be performed before adjusting, by using the display driver circuitry, a data voltage to be provided to one or more sub-pixels respectively including one or more of the OLEDs for a burn-in compensation of the one or more of the OLEDs.

For example, the at least one command according to the first input may include first information indicating a position of one or more layers in the image that apply the filter, and second information indicating a number of the one or more layer in the image that apply the filter. For example, the first information in the at least one command according to the first input indicates a position of the second layer of the image.

For example, the at least one command according to the second input may include first information indicating to enable applying the filter to one or more areas of the display panel, and second information indicating a position of each of the one or more areas of the display panel that apply the filter. For example, the first information in the at least one command according to the second input may indicate to enable applying the filter to the first area of the display panel. For example, the second information in the at least one command according to the second input may indicate a position of the first area of the display panel.

For example, the display driver circuitry may be configured to, based on receiving the at least one command according to the second input, perform the pixel processing with respect to the first area of the display panel, in accordance with gradually adjusting an intensity of the filter applied to the first area of the display panel to a targeted intensity.

As described above, an electronic device (e.g., the electronic device 100) may comprise a display panel (e.g., the display panel 160). The display panel may be configured to adjust a viewing angle of at least a portion of an image displayed on the display panel. The electronic device may comprise display driver circuitry (e.g., the display driver circuitry 221) and at least one processor (e.g., the at least one processor 210) comprising processing circuitry. The display driver circuitry may be configured to display, on the display panel, an image including a first layer, and a second layer positioned on a portion of the first layer to overlap the first layer, receive, from the at least one processor, at least one command associated with a filter for user privacy, while displaying the image, based on receiving, from the at least one processor, the at least one command according to a first input for applying the filter to the second layer of the image, narrow a viewing angle of the second layer of the image according to a first pixel processing of an area of the display panel that applies the filter to the area of the display panel displaying the second layer of the image with a targeted intensity, based on receiving, from the at least one processor, the at least one command according to a second input for applying the filter to the area of the display panel that displays the second layer of the image, narrow a viewing angle of the second layer of the image according to a second pixel processing of the area of the display panel that applies the filter to the area of the display panel by gradually increasing an intensity of the filter applied to the area of the display panel to the targeted intensity.

For example, the viewing angle of the second layer of the image may be gradually narrowed by gradually increasing the intensity of the filter applied to the area of the display panel based on receiving the at least one command according to the second input.

For example, the display driver circuitry may be configured to, while narrowing the viewing angle of the second layer of the image based on receiving the at least one command according to the second input, receive, from the at least one processor, at least another command according to a third input for releasing the filter applied to the area of the display panel, and release the second pixel processing of the area of the display panel by gradually decreasing the intensity of the filter applied to the area of the display panel based on the at least another command according to the third input.

For example, the display driver circuitry may be configured to, while narrowing the viewing angle of the second layer of the image based on receiving the at least one command according to the first input, receive, from the at least one processor, at least another command according to a third input for releasing the filter applied to the second layer of the image, and release the first pixel processing of the area of the display panel based on the at least another command according to the third input.

For example, the display driver circuitry may be configured to, based on receiving the at least one command according to the second input, narrow a viewing angle of another portion of the first layer of the image not overlapping the second layer, according to the third pixel processing of another area of the display panel for applying the filter to another area of the display panel positioned around the area of the display panel.

As described above, an electronic device (e.g., the electronic device 100) may comprise a display panel (e.g., the display panel 160). The display panel may be configured to adjust a viewing angle of at least a portion of an image displayed on the display panel. The electronic device may comprise display driver circuitry (e.g., the display driver circuitry 221), at least one processor (e.g., the at least one processor 210) comprising processing circuitry, and memory, storing instructions, comprising one or more storage media. When executed by the at least one processor individually or collectively, the instructions may cause the electronic device to display, on the display panel, an image including a first layer, and a second layer positioned on a first portion of the first layer to overlap the first layer, while displaying the image, receive, from the at least one processor, an input associated with a filter for user privacy, based on the input identified as a first input for applying the filter to the second layer of the image, control the display panel to perform a pixel processing for the filter with respect to a first area of the display panel displaying the second layer of the image, in order to narrow a viewing angle of the second layer of the image, based on the input identified as a second input for applying the filter to the first area of the display panel that displays the second layer of the image, control the display panel to perform the pixel processing with respect to the first area of the display panel and a second area of the display panel positioned around the first area of the display panel, in order to narrow a viewing angle of a second portion of the first layer of the image not overlapping the second layer of the image and a viewing angle of the second layer of the image.

As described above, an electronic device (e.g., the electronic device 100) may comprise a display panel (e.g., the display panel 160). The display panel may be configured to adjust a viewing angle of at least a portion of an image displayed on the display panel. The electronic device may comprise display driver circuitry (e.g., the display driver circuitry 221), at least one processor (e.g., the at least one processor 210) comprising processing circuitry, and memory, storing instructions, comprising one or more storage media. When executed by the at least one processor individually or collectively, the instructions may cause the electronic device to display, on the display panel, an image including a first layer, and a second layer positioned on a portion of the first layer to overlap the first layer, while displaying the image, receive an input associated with a filter for user privacy, based on the input identified as a first input for applying the filter to the second layer of the image, perform a first pixel processing of an area of the display panel that applies the filter with a targeted intensity to the area of the display panel displaying the second layer of the image, in order to narrow a viewing angle of the second layer of the image, based on the input identified as a second input for applying the filter to the area of the display panel displaying the second layer of the image, perform a second pixel processing of the area of the display panel that applies the filter to the area of the display panel by gradually increasing an intensity of the filter applied to the area of the display panel to the targeted intensity, in order to narrow a viewing angle of the second layer of the image.

The effects that can be obtained from the disclosure are not limited to those described above, and any other effects not mentioned herein will be clearly understood by those having ordinary knowledge in the art to which the disclosure belongs, from the following description.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 1940) including one or more instructions that are stored in a storage medium (e.g., internal memory 1936 or external memory 1938) that is readable by a machine (e.g., the electronic device 1901). For example, a processor (e.g., the processor 1920) of the machine (e.g., the electronic device 1901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method of any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a display panel configured to adjust a viewing angle of at least a portion of an image displayed via a display area of the display panel; and display driver circuitry, wherein the display driver circuitry is configured to:

when a filter for user privacy is applied to a first area of the display area:

perform a first pixel-processing to apply the filter to the first area, wherein the first pixel-processing is performed for controlling a viewing angle, and perform a second pixel-processing to apply the filter to a second area of the display area surrounding the first area, wherein the second pixel-processing is performed for controlling a viewing angle, and wherein an intensity of the filter applied to the second area by the second pixel-processing spatially decreases as a distance from the first area increases.

2. The electronic device of claim 1, wherein an intensity of the filter applied to the first area by the first pixel-processing is spatially constant.

3. The electronic device of claim 2, wherein a viewing angle of the first area to which the filter is applied by the first pixel-processing is spatially constant, and wherein a viewing angle of the second area to which the filter is applied by the second pixel-processing spatially increases as a distance from the first area increases.

4. The electronic device of claim 2, wherein, when the filter is applied to the first area of the display area, the filter is not applied to a third area of the display area surrounding the second area of the display area.

5. The electronic device of claim 2, wherein the display driver circuitry is further configured to:

when the filter is applied to the first area, perform a third pixel-processing to apply the filter to the first area before performing the first pixel-processing to apply the filter to the first area, wherein the third pixel-processing is performed for controlling a viewing angle, and wherein an intensity of the filter applied to the first area by the third pixel-processing temporally increases to reach a targeted intensity corresponding to an intensity of the filter applied to the first area by the first pixel-processing.

6. The electronic device of claim 5, wherein an intensity of the filter applied to the first area by the first pixel-processing is temporally constant.

7. The electronic device of claim 5, wherein a viewing angle of the first area to which the filter is applied by the third pixel-processing temporally decreases to reach a targeted viewing angle corresponding to a viewing angle of the first area to which the filter is applied by the first pixel-processing.

8. The electronic device of claim 5, wherein the display driver circuitry is further configured to:

when the filter applied to the first area is released, perform a fourth pixel-processing to apply the filter to the first area before releasing the filter from the first area, wherein the fourth pixel-processing is performed for controlling a viewing angle, and wherein an intensity of the filter applied to the first area by the fourth pixel-processing temporally decreases from the targeted intensity.

9. The electronic device of claim 1, further comprising:

at least one processor comprising processing circuitry; and memory comprising one or more storage media storing instructions, when executed by the at least one processor, to cause the at least one processor to:

based on an input or a setting for applying the filter to the first area, transmit, to the display driver circuitry, at least one command, wherein the display driver circuitry is further configured to:

based on the at least one command, perform both the first pixel-processing and the second pixel-processing.

10. The electronic device of claim 1, wherein the display driver circuitry is further configured to:

when the filter is applied to the first area of the display area, perform the first pixel-processing and the second pixel-processing after performing another pixel-processing that adjusts a data voltage applied to a second sub-pixel in the display panel adjacent to a first sub-pixel in the display panel based on an adjustment of a data voltage applied to the first sub-pixel.

11. The electronic device of claim 10, wherein the other pixel-processing comprises:

performing an upscaling with respect to an image displayed via the display panel;

performing an edge sharpening of at least one visual object included in an image displayed via the display panel;

performing a blur processing with respect to at least a portion of an image via displayed the display panel;

performing a high dynamic range (HDR) processing with respect to at least a portion of an image displayed via the display panel;

performing a temporal dithering with respect to at least a portion of an image displayed via the display panel; and/or performing a spatial dithering with respect to at least a portion of an image displayed via the display panel.

12. The electronic device of claim 1, wherein the display panel comprises:

a first set of areas in the display area, and a second set of areas in the display area, wherein areas included in the first set and areas included in the second set are arranged to alternate with each other, and wherein light emitted from pixels positioned in the areas included in the first set has a narrower viewing angle than light emitted from pixels positioned in the areas included in the second set.

13. The electronic device of claim 12, wherein the display panel further comprises:

a first layer including a plurality of pixels each including sub-pixels, and a second layer, disposed above the first layer, including a black matrix, and wherein the black matrix partially overlies the pixels positioned in the areas included in the first set and does not overlie the pixels positioned in the areas included in the second set.

14. The electronic device of claim 13, wherein the first layer includes a pixel definition layer (PDL) defining sub-pixels, wherein the black matrix is disposed over a portion of the PDL defining sub-pixels positioned in the areas included in the first set and is not disposed over another portion of the PDL defining sub-pixels positioned in the areas included in the second set.

15. The electronic device of claim 14, wherein a width of a sub-pixel defined by the PDL and positioned in the areas included in the first set is substantially the same as a width of a sub-pixel defined by the PDL and positioned in the areas included in the second set.

16. An electronic device comprising:

a display configured to adjust a viewing angle of at least a portion of an image displayed via a display area;

at least one processor comprising processing circuitry; and memory comprising one or more storage media storing instructions to cause the at least one processor to:

when a filter for user privacy is applied to a first area of the display area:

perform a first pixel-processing to apply the filter to the first area, wherein the first pixel-processing is performed for controlling a viewing angle, and perform a second pixel-processing to apply the filter to a second area of the display area surrounding the first area, wherein the second pixel-processing is performed for controlling a viewing angle, and wherein an intensity of the filter applied to the second area by the second pixel-processing spatially decreases as a distance from the first area increases.

17. The electronic device of claim 16, wherein an intensity of the filter applied to the first area by the first pixel-processing is spatially constant.

18. The electronic device of claim 17, wherein a viewing angle of the first area to which the filter is applied by the first pixel-processing is spatially constant, and wherein a viewing angle of the second area to which the filter is applied by the second pixel-processing spatially increases as a distance from the first area increases.

19. The electronic device of claim 17, wherein, when the filter is applied to the first area of the display area, the filter is not applied to a third area of the display area surrounding the second area of the display area.

20. The electronic device of claim 17, wherein the instructions further cause the at least one processor to:

when the filter is applied to the first area, perform a third pixel-processing to apply the filter to the first area before performing the first pixel-processing to apply the filter to the first area, wherein the third pixel-processing is performed for controlling a viewing angle, and wherein an intensity of the filter applied to the first area by the third pixel-processing temporally increases to reach a targeted intensity corresponding to an intensity of the filter applied to the first area by the first pixel-processing.

* * * * *